United States Patent
Kim et al.

(10) Patent No.: US 10,442,295 B2
(45) Date of Patent: Oct. 15, 2019

(54) DISPLAY DEVICE AND VEHICLE HAVING THE SAME

(71) Applicant: LG Electronics Inc., Seoul (KR)

(72) Inventors: Sangwon Kim, Seoul (KR); Kyunglack Kim, Seoul (KR); Junman Cho, Seoul (KR); Sangroc Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/857,303

(22) Filed: Dec. 28, 2017

(65) Prior Publication Data
US 2019/0070961 A1 Mar. 7, 2019

(30) Foreign Application Priority Data

Sep. 5, 2017 (KR) .................. 10-2017-0113317

(51) Int. Cl.
*B60K 37/02* (2006.01)
*B60K 35/00* (2006.01)
(Continued)

(52) U.S. Cl.
CPC .............. *B60K 37/02* (2013.01); *B60K 35/00* (2013.01); *G02B 27/01* (2013.01); *G02B 27/144* (2013.01); *G08G 1/0962* (2013.01); *B60K 37/06* (2013.01); *B60K 2370/152* (2019.05); *B60K 2370/155* (2019.05); *B60K 2370/1531* (2019.05); *B60K 2370/161* (2019.05); *B60K 2370/179* (2019.05); *B60K 2370/182* (2019.05); *B60K 2370/186* (2019.05); *B60K 2370/1868* (2019.05); *B60K 2370/193* (2019.05); *B60K 2370/21* (2019.05);
(Continued)

(58) Field of Classification Search
None
See application file for complete search history.

(56) References Cited

U.S. PATENT DOCUMENTS 3,885,095 A * 5/1975 Wolfson .................. G02B 27/01
348/115
5,340,108 A * 8/1994 Gerpheide ......... A63B 69/3623
273/358
(Continued)

FOREIGN PATENT DOCUMENTS

EP 1067502 1/2001
JP 08-085385 4/1996
(Continued)

OTHER PUBLICATIONS

European Search Report in European Application No. 18178516.3, dated Nov. 19, 2018, 8 pages.

*Primary Examiner* — Chico A Foxx
(74) *Attorney, Agent, or Firm* — Fish & Richardson P.C.

(57) ABSTRACT

The present invention relates to a display device provided in a vehicle, the display device including a first display configured to output first light forming first time information, a second display configured to output second light forming second visual information, and a light synthesizing unit disposed between the first and second displays and configured to transmit one of the first light and the second light and reflect another one so that the first light and the second light are directed to the same path, and wherein the light synthesizing unit is formed tiltable such that a reference angle formed between the light synthesizing unit and the first display varies.

20 Claims, 19 Drawing Sheets

(51) Int. Cl.
  *G08G 1/0962* (2006.01)
  *G02B 27/01* (2006.01)
  *G02B 27/14* (2006.01)
  *B60K 37/06* (2006.01)
  *G08G 1/16* (2006.01)

(52) U.S. Cl.
  CPC .... *B60K 2370/27* (2019.05); *B60K 2370/334* (2019.05); *B60K 2370/347* (2019.05); *B60K 2370/52* (2019.05); *G08G 1/166* (2013.01)

(56) References Cited

U.S. PATENT DOCUMENTS

| | | | | |
|---|---|---|---|---|
| 6,327,093 | B1* | 12/2001 | Nakanishi | G02B 27/145 348/E5.141 |
| 7,517,096 | B2* | 4/2009 | Park | G02B 26/0841 348/771 |
| 8,712,239 | B1* | 4/2014 | Miglani | G02B 6/26 359/212.1 |
| 10,067,561 | B2* | 9/2018 | San Agustin Lopez | G06F 3/013 |
| 2006/0072079 | A1* | 4/2006 | Park | G02B 26/0841 353/99 |
| 2006/0290482 | A1* | 12/2006 | Matsumoto | B60Q 1/2665 340/436 |
| 2008/0212214 | A1* | 9/2008 | Wade | G02B 7/182 359/839 |
| 2009/0010495 | A1* | 1/2009 | Schamp | B60R 21/0134 382/106 |
| 2010/0079672 | A1* | 4/2010 | Bae | G06F 3/0483 348/565 |
| 2012/0008048 | A1* | 1/2012 | Sekine | G06T 19/006 348/566 |
| 2013/0265646 | A1* | 10/2013 | Sakai | G02B 27/01 359/631 |
| 2015/0015712 | A1* | 1/2015 | Sempuku | G08G 1/165 348/148 |
| 2015/0154461 | A1* | 6/2015 | Kitaura | G06K 9/00845 348/148 |
| 2015/0331239 | A1* | 11/2015 | Ando | G02B 27/01 359/631 |
| 2015/0377430 | A1* | 12/2015 | Bhakta | G03B 21/204 362/84 |
| 2015/0379773 | A1 | 12/2015 | Yasuhiro et al. | |
| 2016/0183796 | A1* | 6/2016 | Fukuma | A61B 5/1171 705/2 |
| 2017/0059857 | A1* | 3/2017 | Laroia | G02B 27/0018 |
| 2017/0272726 | A1* | 9/2017 | Ovsiannikov | G01C 11/30 |
| 2017/0351107 | A1* | 12/2017 | Seder | G02B 27/01 |
| 2018/0033919 | A1* | 2/2018 | Lee | H01L 33/46 |
| 2018/0356630 | A1* | 12/2018 | Masuya | G02B 27/0101 |

FOREIGN PATENT DOCUMENTS

| | | |
|---|---|---|
| JP | 2009192434 | 8/2009 |
| JP | 2012056384 | 3/2012 |
| KR | 1020140079905 | 6/2014 |
| KR | 1020140133994 | 11/2014 |

* cited by examiner (a)

(b)

(a)

(b)

DISPLAY DEVICE AND VEHICLE HAVING THE SAME

CROSS-REFERENCE TO RELATED APPLICATION

Pursuant to 35 USC § 119 (a), this application claims the benefit of an earlier filing date and priority to Korean Application No. 10-2017-0113317, filed on Sep. 5, 2017, the contents of which are incorporated by reference herein in its entirety.

TECHNICAL FIELD

The present invention relates to a display device capable of outputting driving information related to a vehicle, and a vehicle having the same.

BACKGROUND

A vehicle refers to a means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

As the functions of the vehicle are diversified, various types of driving information are provided. The functions of the vehicle are classified into a convenience function and a safety function. Driving information for the safety function needs to be intuitively transmitted to the driver as compared with driving information for the convenience function. It is necessary to develop a display device capable of effectively transmitting various driving information according to a driving situation of the vehicle.

SUMMARY

The present invention is directed to solving the above-mentioned problems and other drawbacks.

An aspect of the present invention is to provide a display device, capable of effectively transmitting various types of driving information, and a vehicle having the same. Specifically, the present invention provides a display device capable of generating a different sense of depth according to driving information to be displayed, and a vehicle having the same.

An aspect of the present invention is to provide a display device, capable of three-dimensionally providing driving information using not only a hardware configuration of a display but also an optical illusion effect by software, and a vehicle having the same.

To achieve these and other advantages and in accordance with the purpose of this specification, as embodied and broadly described herein, there is provided a display device provided in a vehicle, the device including a first display configured to output first light forming first visual information, a second display configured to output second light forming second visual information, and a light synthesizing unit disposed between the first and second displays and configured to transmit one of the first light and the second light and reflect another one so that the first light and the second light are directed to the same path, and wherein the light synthesizing unit is formed tiltable such that a reference angle formed between the light synthesizing unit and the first display varies.

According to one embodiment, the device may further include a driving unit having a rotation shaft for providing power, and the light synthesizing unit may be coupled to the rotation shaft to be tiltable between the first display and the second display.

According to one embodiment, the device may further include a processor configured to control the driving unit such that the reference angle is changed to a predetermined angle corresponding to a preset condition, in response to the preset condition being satisfied.

According to one embodiment, the processor may control the second display to output a second graphic object corresponding to a first graphic object when the preset condition is satisfied while the first graphic object is output on the first display.

According to one embodiment, the processor may set an output position of the second graphic object based on an output position of the first graphic object so that the second graphic object overlaps the first graphic object on the light synthesizing unit.

According to one embodiment, the processor may set the predetermined angle so that the second graphic object overlaps the first graphic object on the light synthesizing unit.

According to one embodiment, the first graphic object may disappear from the first display when the second graphic object is output on the second display.

According to one embodiment, the processor may control the first display to output the first graphic object when there is an external object having possibility of collision with the vehicle which is a first level, and control the second display to output the second graphic object when the possibility of collision is a second level.

According to one embodiment, the reference angle may vary depending on the possibility of collision.

According to one embodiment, the processor may control the first and second displays such that the first and second graphic objects disappear and control the driving unit such that the reference angle has an initial setting value, when the possibility of collision is lower than a reference level.

According to one embodiment, at least one of an output position and an output size of the second graphic object on the second display may vary according to the predetermined angle.

According to one embodiment, at least one of an output position and an output size of a screen output on the first display may vary according to the predetermined angle when the second graphic object is output on the second display.

According to one embodiment, the processor may control the driving unit so that the light synthesizing unit is not tilted even through the preset condition is satisfied, when a stereoscopic display mode is turned off in the vehicle.

According to one embodiment, the device may further include a light source unit disposed on one end of the light synthesizing unit and configured to emit light of a predetermined color to the light synthesizing unit.

According to one embodiment, the light synthesizing unit may be tilted such that the reference angle has a predetermined angle, and the predetermined angle may vary according to speed of the vehicle.

According to one embodiment, the light synthesizing unit may be tilted such that the reference angle has a predetermined angle, and the predetermined angle may vary according to a user input.

According to one embodiment, the light synthesizing unit may be tilted such that the reference angle has a predetermined angle, and the predetermined angle may vary according to a position of eyes of a driver seated in the vehicle.

According to one embodiment, the light synthesizing unit may be formed such that light transmittance of at least one area thereof is variable, and the light transmittance may vary according to the reference angle.

According to one embodiment, the light synthesizing unit may include a first light synthesizing portion having first light transmittance, and a second synthesizing portion overlapping the first light synthesizing portion and having second light transmittance. At least one of the first light transmittance and the second light transmittance may vary according to the reference angle.

According to one embodiment, the light synthesizing unit may be tilted such that the reference angle has an initial setting value when the second display is turned off.

Further, the present invention can extend even to a vehicle having the display device and/or a method of controlling the vehicle.

Hereinafter, effects of a display device and a vehicle having the same according to the present invention will be described.

The display device can produce an effect of varying at least one of an output size and an output position of information displayed on the second display by adjusting the reference angle.

According to one embodiment, when there is an object with possibility of collision, notification information for notifying the object can be provided in a two-dimensional manner through a first graphic object or in a three-dimensional manner through a second graphic object according to the possibility of collision. Furthermore, since the reference angle of the light synthesizing unit varies according to the possibility of collision, the notification information can be more effectively transmitted to the passenger.

Furthermore, since the reference angle changes depending on the eye position of the passenger, it may be possible to prevent in advance visual information, which is output from the second display and reflected by the light synthesizing unit, from disappearing from the passenger's field of view.

Further, the display device can provide a blurring effect with respect to first visual information output from the first display by adjusting the light transmittance of the light synthesizing unit. In other words, since the first visual information is changed to an out-of-focus state according to the transmittance of the light synthesizing unit but second visual information is displayed as it is on the second display, a depth of field can be lowered. An effect of viewing the display device using a telephoto lens can be generated, so that a concentration of the passenger on the second visual information can be induced.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
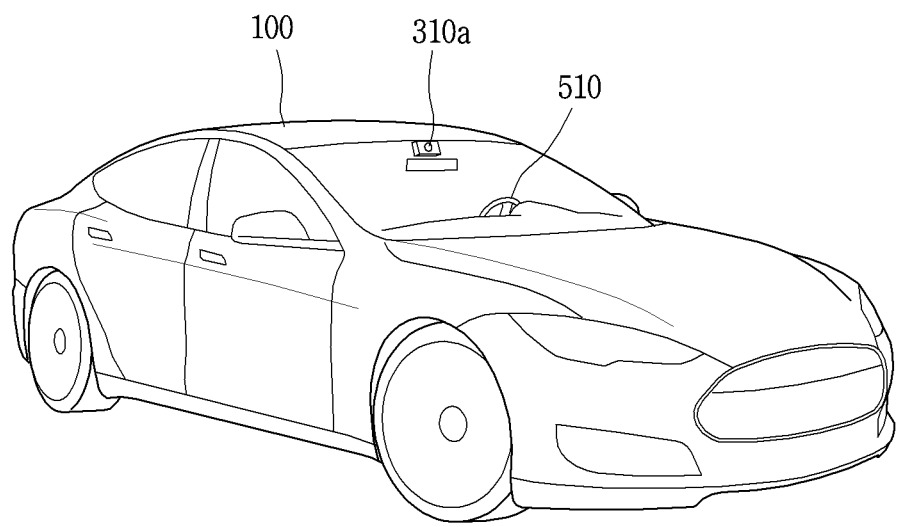
FIG. 1 is a view illustrating appearance of a vehicle in accordance with an embodiment of the present invention.
Figure 1:
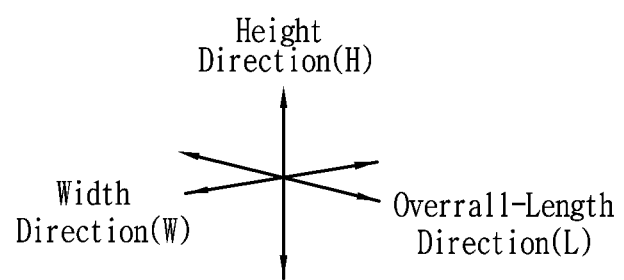

FIG. 1 is a view illustrating appearance of a vehicle in accordance with an embodiment of the present invention.

Figure 2:
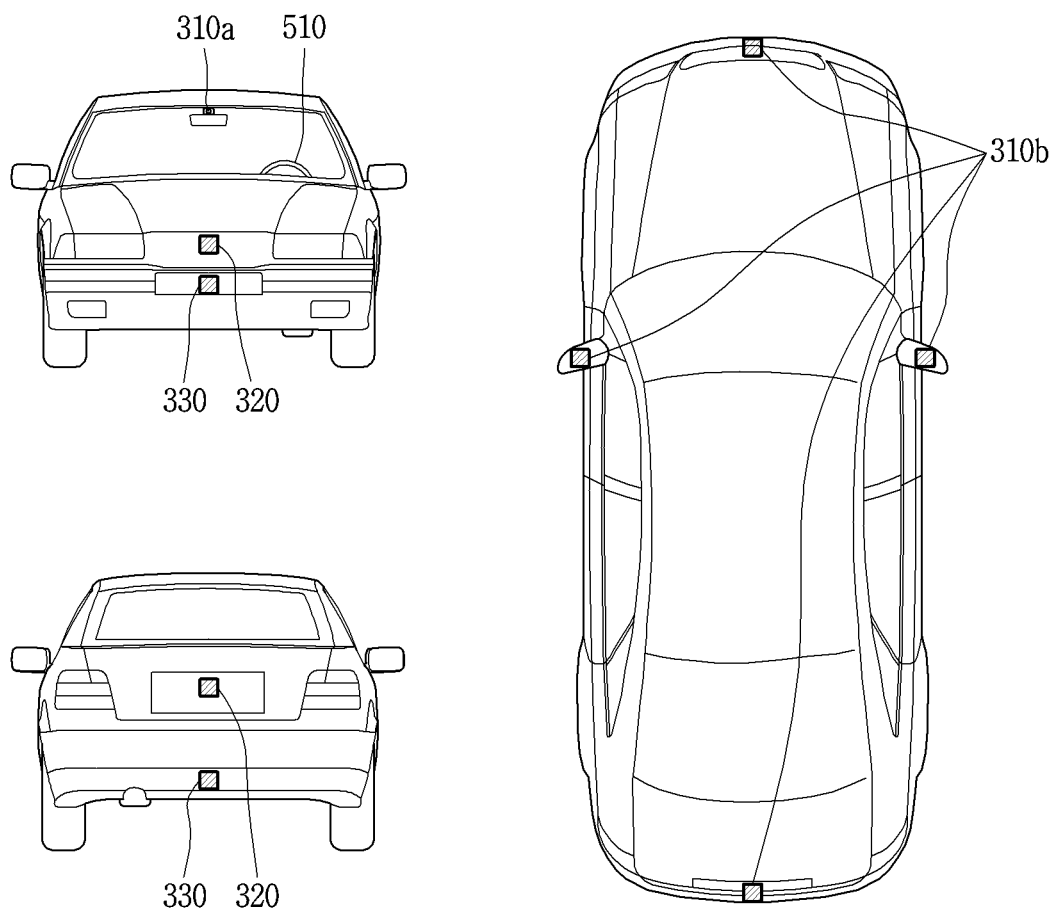
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
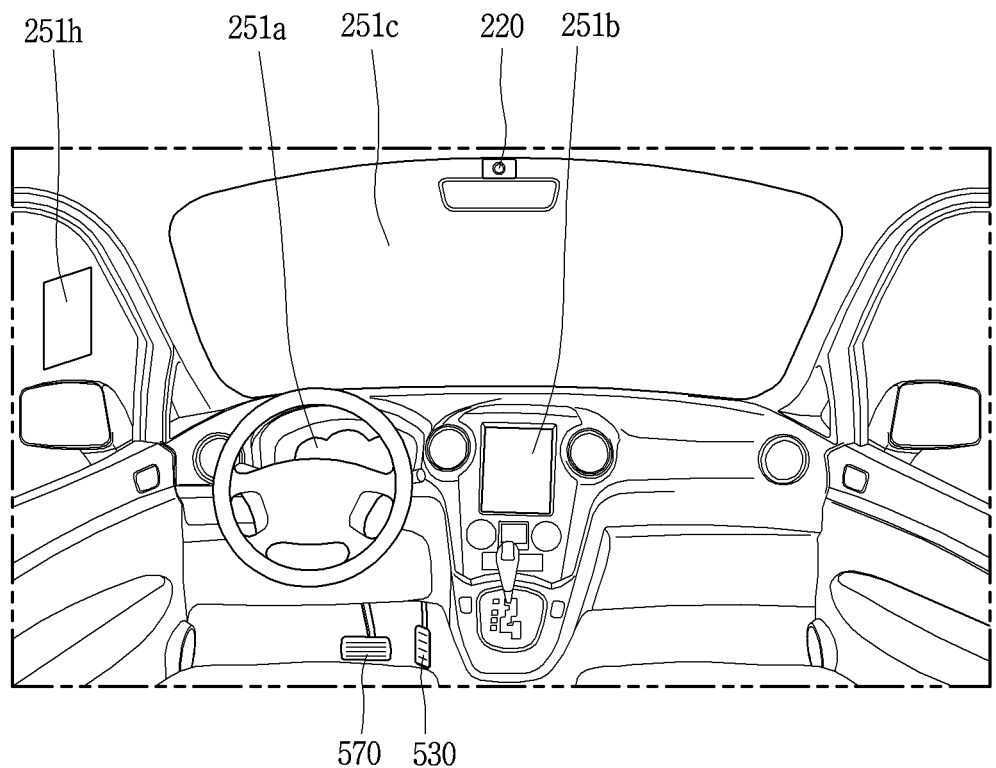
FIGS. 3 and 4 are views illustrating an inside of a vehicle in accordance with an embodiment of the present invention.
Figure 4:
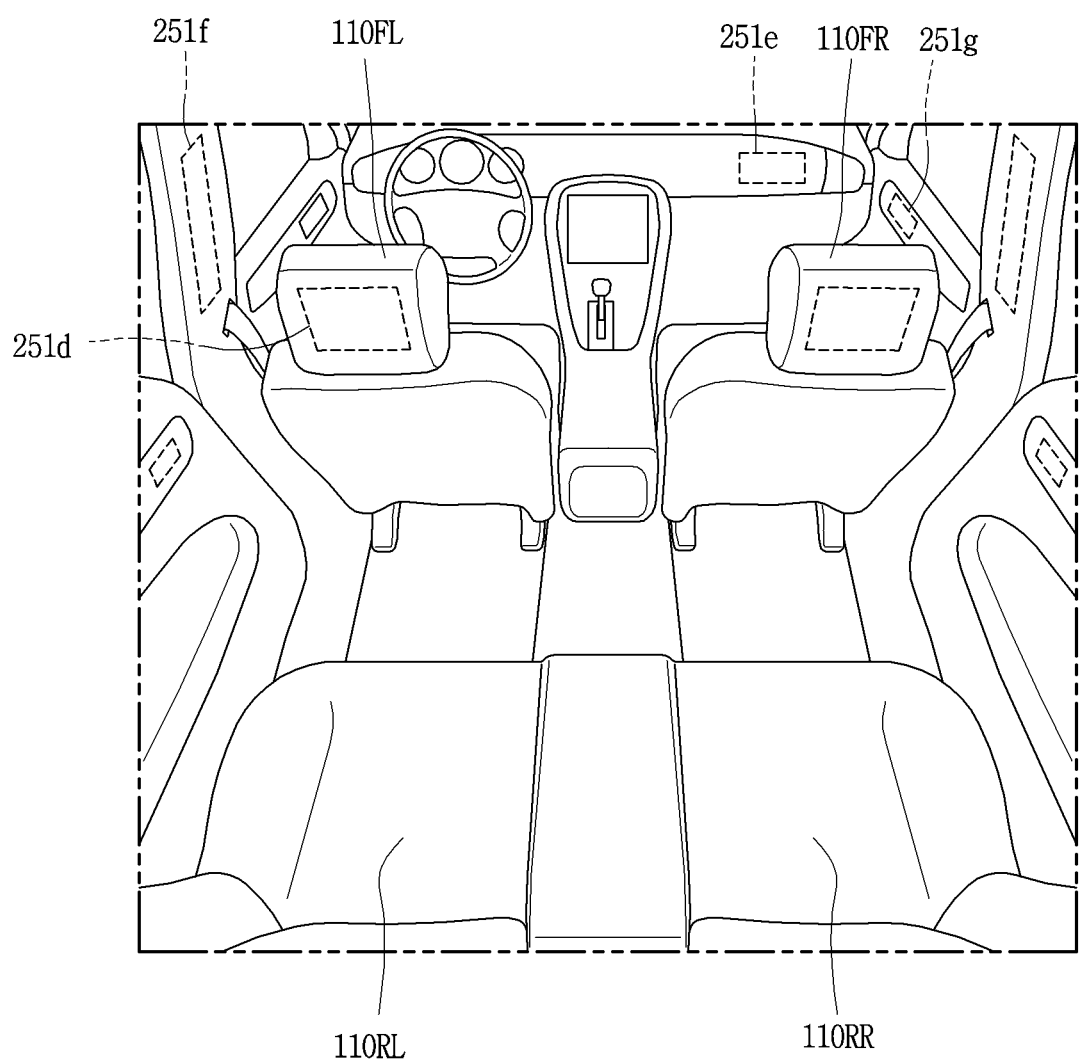

FIGS. 3 and 4 are views illustrating an inside of a vehicle in accordance with an embodiment of the present invention.

Figure 5:
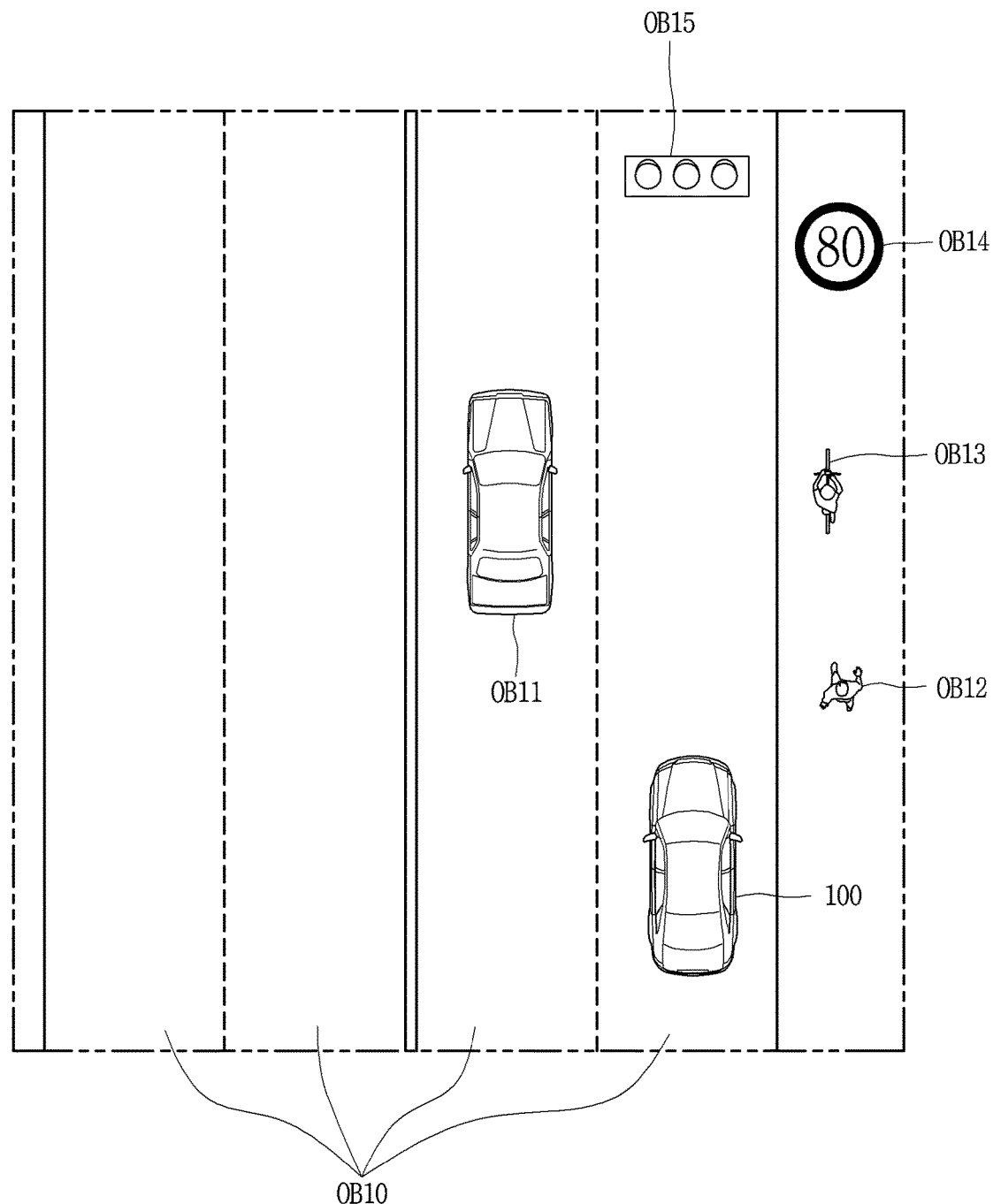
FIGS. 5 and 6 are reference views illustrating objects in accordance with an embodiment of the present invention.
Figure 6:
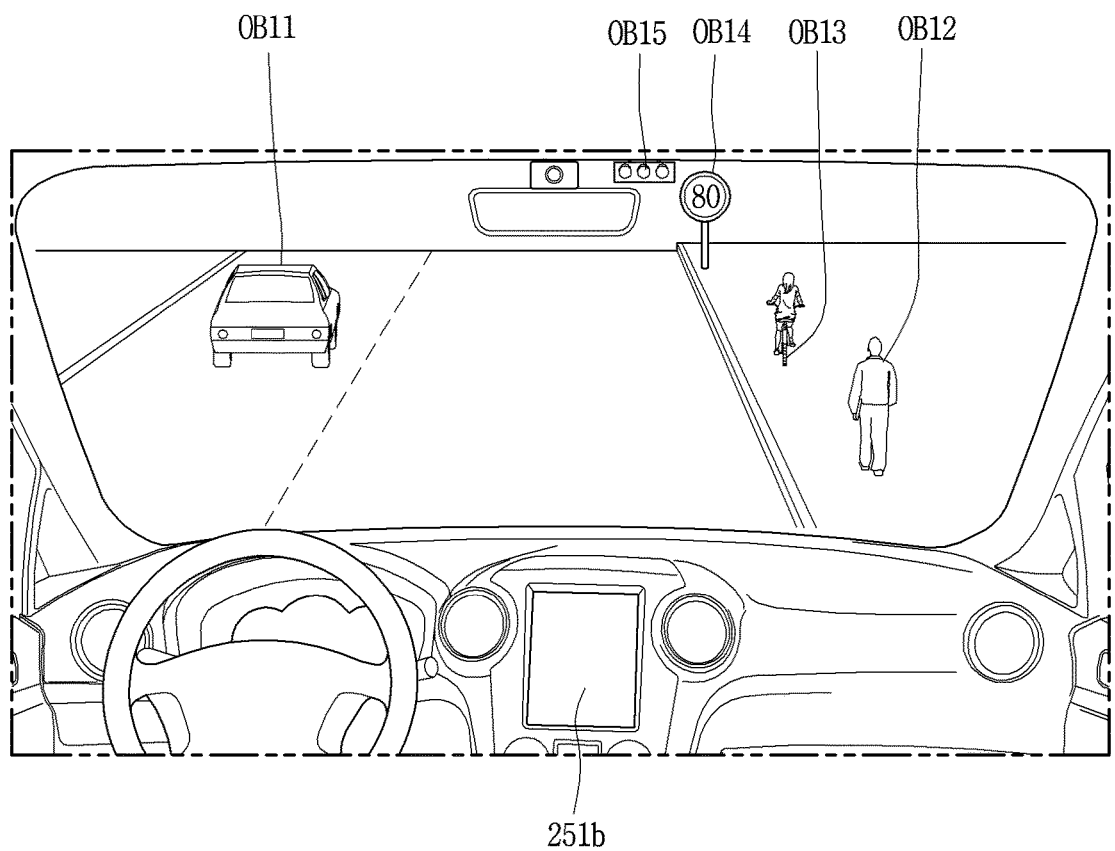

FIGS. 5 and 6 are reference views illustrating objects in accordance with an embodiment of the present invention.

Figure 7:
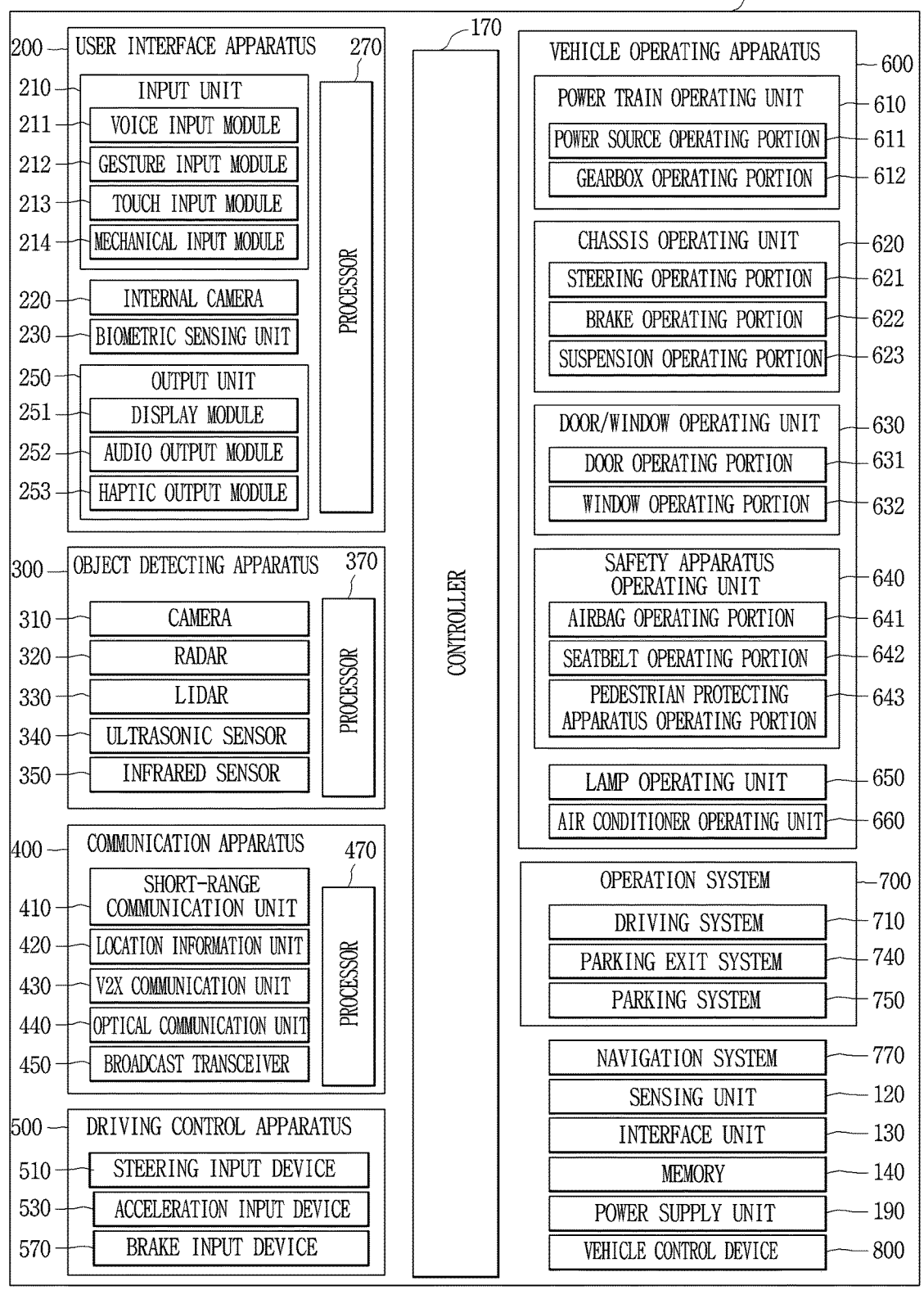
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object.

The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a display device 800 provided in the vehicle 100 will be described in detail.

The display device 800 is provided in the vehicle 100, and may be implemented as an independent device detachable from the vehicle 100 or as a part of the vehicle 100 which is integrally installed in the vehicle 100. The display device may refer to the display unit 271 described above with reference to FIG. 7.

Hereinafter, for the sake of explanation, description will be given of an example that the display device 800 is a separate component independent of the controller 170 of the vehicle 100. However, this is only an embodiment of the present invention, and all the operation and control method of the display device 800 described in this specification may alternatively be performed by the controller 170 of the vehicle 100. That is, the operation and/or control method performed by a processor 860 of the display device 800 may be performed by the controller 170 of the vehicle 100.

The present invention will illustrate an example in which the display device 800 is a cluster that is disposed at a driver's seat and provides various types of vehicle driving information to the driver. However, the present invention is not limited thereto. For example, the display device 800 may be disposed at various locations within the vehicle 100 to provide various types of information.

Figure 8A:
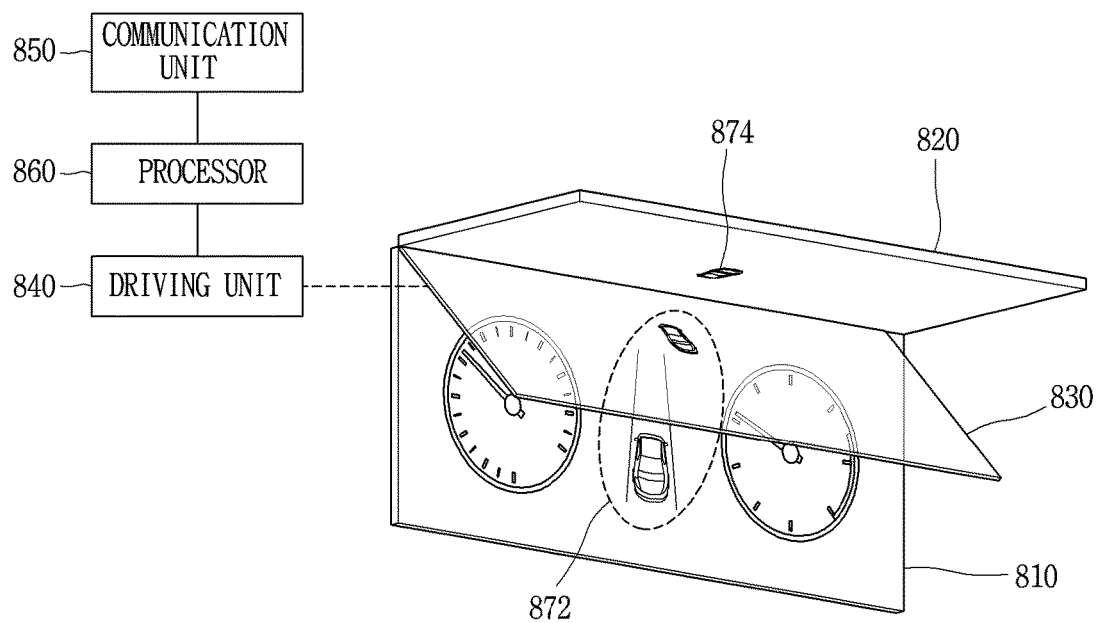
FIG. 8A is a block diagram illustrating a display device according to one embodiment of the present invention.
Figure 8B:
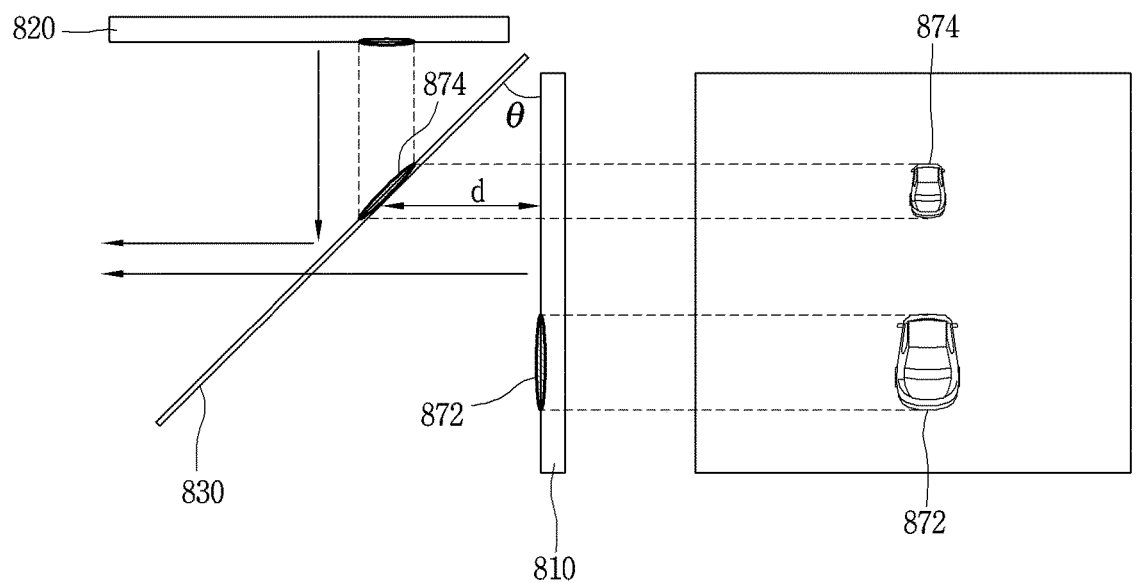
FIG. 8B is a side view and a front view of the display device of FIG. 8A.

FIG. 8A is a conceptual view illustrating a display device according to one embodiment of the present invention, and FIG. 8B is a side view and a front view of the display device 800 of FIG. 8A.

Referring to FIG. 8A, the display device 800 may include at least one of a communication unit 850, a first display 810, a second display 820, a light control unit 830, a processor 860, and a driving unit 840. In some implementations, the light control unit 830 can be a synthesizing unit that synthesizes multiple lights into one light.

The communication unit 850 is configured to perform communication with the various components described in FIG. 7. For example, the communication unit 850 may receive various types of information provided through a controller area network (CAN). In another example, the communication unit 850 may perform communication with all devices capable of performing communication, such as a vehicle, a mobile terminal, a server, and another vehicle. This may be referred to as Vehicle to everything (V2X) communication. The V2X communication may be defined as technology of exchanging or sharing information, such as traffic condition and the like, while communicating with a road infrastructure and other vehicles during driving.

The communication unit 850 may receive information related to the driving of the vehicle from most of devices provided in the vehicle 100. The information transmitted from the vehicle 100 to the display device 800 is referred to as 'vehicle driving information (or vehicle travel information)'.

The vehicle driving information includes vehicle information and surrounding information related to the vehicle. In some implementations, information related to the inside of the vehicle based on the frame of the vehicle 100 may be defined as the vehicle information, and information related to the circumstances or situations in which the vehicle is placed may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle 100, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

The first and second displays 810 and 820 may output various information under the control of the processor 860 provided in the display device 800. For example, the first display 810 may output first light that forms first visual information, and the second display 820 may output second light that forms second visual information. The first and second visual information may relate to the aforementioned vehicle driving information.

The displays 810 and 820 may include at least one of a liquid crystal display (LCD), a thin film transistor-LCD (TFT LCD), an organic light-emitting diode (OLED), a flexible display, a three-dimensional (3D) display, and an e-ink display.

The first display 810 may be oriented toward a first direction and the second display 820 may be oriented toward a second direction that is perpendicular to the first direction. The second direction may indicate a direction forming an angle of a predetermined range approximately perpendicular to the first direction.

The first direction may be a direction facing driver's eyes when the driver is seated in the driver's seat, and the second direction may be a direction having a predetermined angle with respect to the first direction. In one example, the second direction may be a gravitational direction.

According to the arrangement of the first and second displays 810 and 820, the first display 810 enters the driver's view but the second display 820 is out of the driver's view when the driver is seated in the driver's seat.

The light synthesizing unit 830 is located on an advancing path of each of the first light and the second light. Specifically, the light synthesizing unit 830 forms a first acute angle with the first display 810 and a second acute angle with the second display 820. The first acute angle and the second acute angle may be the same angle or different angles.

One end of the light synthesizing unit 830 may be located adjacent to the first and second displays 810 and 820. The light synthesizing unit 830 may be arranged between the first and second displays 810 and 820 in a manner of getting farther away from the first and second displays 810 and 820 from one end of the light synthesizing unit 830 toward another end of the light synthesizing unit 830.

The light synthesizing unit 830 allows the first light to transmit therethrough and reflect the second light between the first and second displays 810 and 820 so that the first light and the second light are directed to the same path. In other words, the light synthesizing unit 830 synthesizes the first light and the second light so that the first light and the second light can be directed to the same optical path.

The light synthesizing unit 830 may be a mirror such as a dichroic mirror.

The second light generated in the second display 820 arranged to face the second direction is synthesized with the first light by the light synthesizing unit 830 to form synthesized light, which proceeds toward the first direction.

For example, as illustrated in FIG. 8A, a first graphic object 872 may be output on the first display 810, and a second graphic object 874 may be output on the second display 820.

The first light corresponding to the first graphic object 872 is transmitted through the light synthesizing unit 830 without being reflected by the light synthesizing unit 830, so as to be intuitively perceived or recognized as being output from the first display 810. This is because the light synthesizing unit 830 is made transparent.

On the other hand, since the second light corresponding to the second graphic object 874 is reflected by the light synthesizing unit 830, the user may recognize that the second visual information is being displayed on the light synthesizing unit 830.

Referring to FIG. 8B, the user recognizes that the first graphic object 872 is located on the first display 810 and the second graphic object 874 is located on the light synthesizing unit 830. Accordingly, the first and second graphic objects 872 and 874 may have a distance therebetween as far as a distance d between the light synthesizing unit 830 and the first display 810.

The user may perceive the first and second graphic objects 872 and 874 as the second graphic object 874 is located above the first graphic object 872. The user may perceive the first and second graphic objects 872 and 874 as the second graphic object 874 is located closer to him/her than the first graphic object 872, or the first graphic object 872 is located farther away from him/her than the second graphic object 874. That is, the user may feel three-dimensional (3D) depth due to the difference in position between the light synthesizing unit 830 and the first display 810.

Information output on each display may obtain 3D depth when the first visual information is displayed on the first display 810 and the second visual information is displayed on the second display 820 at the same time.

Here, 'sense of depth' or 'depth value' refers to an index indicating a difference in distance between a virtual one point and an object displayed on the display device 800. A depth value of an object may be defined as "0" when the object displayed on the display device 800 is located at a predetermined point. A depth value of an object which seems to have a shape protruding from the predetermined point to outside of the display device 800 may be defined as a negative value, and a depth value of an object which seems to have an inwardly concave (recessed) shape may be defined as a positive value. It may be construed that the object is farther away from the predetermined point when an absolute value of the depth value is larger.

Although the same graphic object is displayed in the same size, it may have a different depth value according to an output position on the second display 820. This is because the light synthesizing unit 830 is positioned between the first and second displays 810 and 820 and one surface of the light synthesizing unit 830 forms a predetermined angle θ with the first display 810.

Hereinafter, the angle between the light synthesizing unit 830 and the first display 810 is defined as a "reference angle".

If no information is displayed on the second display 820, the user is provided with information displayed on the first display 810 in a two-dimensional (2D) form.

On the other hand, when information is displayed on the second display 820, all information displayed on the first and second displays 810 and 820 may be provided in a three-dimensional (3D) form. Due to the difference in position between the light synthesizing unit 830 and the first display 810, the information displayed on the second display 820 has a different depth value depending on its output position.

The processor 860 is configured to control at least one of the first and second displays 810 and 820.

Specifically, the processor 860 may determine whether or not at least one of a plurality of preset conditions is satisfied, based on vehicle driving information received through the communication unit 850. The processor 860 may control at least one of the first and second displays 810 and 820 in a different way, so as to output information corresponding to the satisfied condition.

In connection with the preset conditions, the processor 860 may detect an occurrence of an event in an electric component and/or application provided in the vehicle 100, and determine whether the detected event meets the preset condition. At this time, the processor 860 may detect the occurrence of the event from the information received through the communication unit 810.

The application is a concept including a widget, a home launcher, and the like, and refers to all types of programs that can be run on the vehicle 100. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence may be a missed call, presence of an application to be updated, a message arrival, start on, start off, autonomous driving on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be a generation of forward collision warning, a generation of a blind spot detection, a generation of lane departure warning, a generation of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

When the occurred event satisfies a preset condition, the processor 860 controls the first display 810 and/or the second display 820 to output information corresponding to the satisfied condition.

When an event occurs, information related to the occurred event needs to be provided to the passenger of the vehicle 100. At this time, the information displayed on the first display 810 and the information displayed on the second display 820 are distinguished from each other.

For example, general information to be provided to a passenger may be displayed on the first display 810 as main information, and sub information for emphasizing the main information may be displayed on the second display 820.

In another example, the first display 810 may output the vehicle driving information, and the second display 820 may output a graphical object associated with the vehicle driving information.

In another example, when a preset condition is satisfied while predetermined visual information is output on the first display 810, the processor 860 may move the predetermined visual information to the second display 820. In other words, the predetermined visual information which is being output on the first display 810 may disappear from the first display 810 and then output on the second display 820.

The processor 860 may display a graphic object corresponding to the vehicle driving information on the second display 820.

The graphic object corresponding to the vehicle driving information is for emphasizing information displayed on the first display 810, and may differ according to the information displayed on the first display 810. As another example, the graphic object may become a different graphic object depending on a type of event occurred. Here, the different graphic object, for example, may refer to an image having a different shape, length, color, or the like.

The type of the graphic object displayed on the second display 820 may vary according to the vehicle driving information displayed on the first display 820.

An output position of the graphic object on the second display 820 may vary depending on a driving situation of the vehicle. Here, the driving situation may relate to at least one of a position, acceleration, a running speed, and a running direction of the vehicle 100, and collision possibility with an external object.

Since the vehicle is premised on movement, information provided in the vehicle has its own position data. For example, route guidance information has position data of a point for which a route guidance should be provided, and object information having possibility of collision has position data of a point where the object is located.

When displaying information with position data, it is important to effectively inform a passenger of a point corresponding to the position data. The display device 800 according to the present invention can effectively guide the point using the light synthesizing unit 830, which is disposed tilted to have a predetermined angle with respect to the first display 810.

Specifically, the processor 860 of the display device 800 may adjust the output position of the information to have a different depth value depending on how far the point is away from the vehicle 100. This is because even the same information has a different depth value according to where (on which point) it is output on the second display 820.

For example, when the point is located within a first distance range, information to guide the point is output at a position away from one end of the second display 820 by a first distance. On the other hand, when the point is located within a second distance range, the information to guide the point may be output at a position away from the one end of the second display 820 by a second distance farther than the first distance. The passenger intuitively recognizes how far the point is located since the depth value differs according to the output position.

Hereinafter, various embodiments in which the processor 860 outputs information having 3D depth using the second display 820 will be described with reference to the accompanying drawings.

Figure 8C:
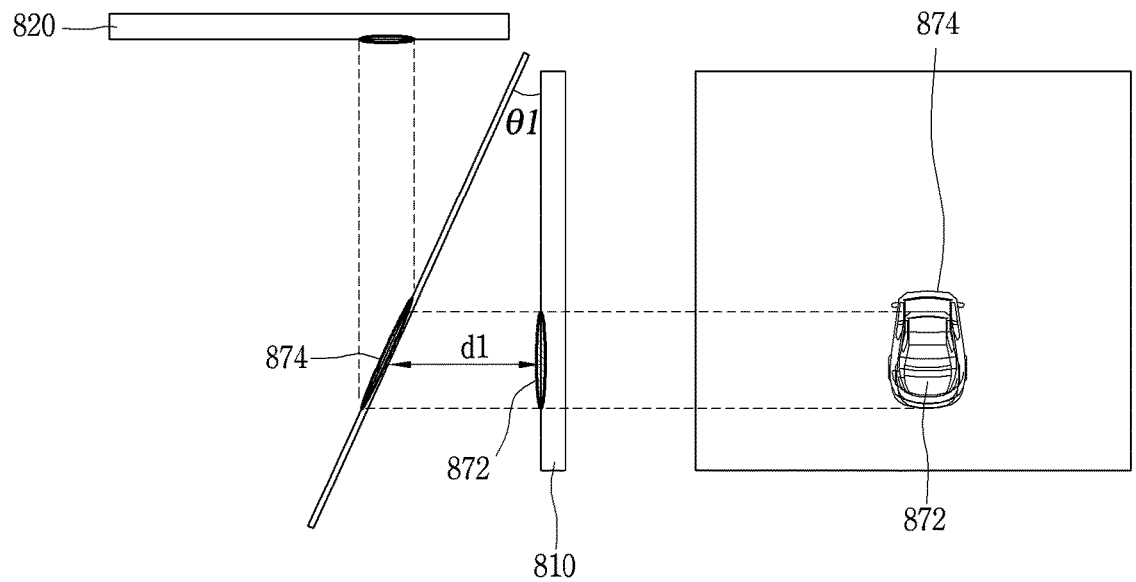
FIG. 8C is an exemplary view illustrating a change in three-dimensional depth according to tilting of a light synthesizing unit.
Figure 8C:
Figure 8C:
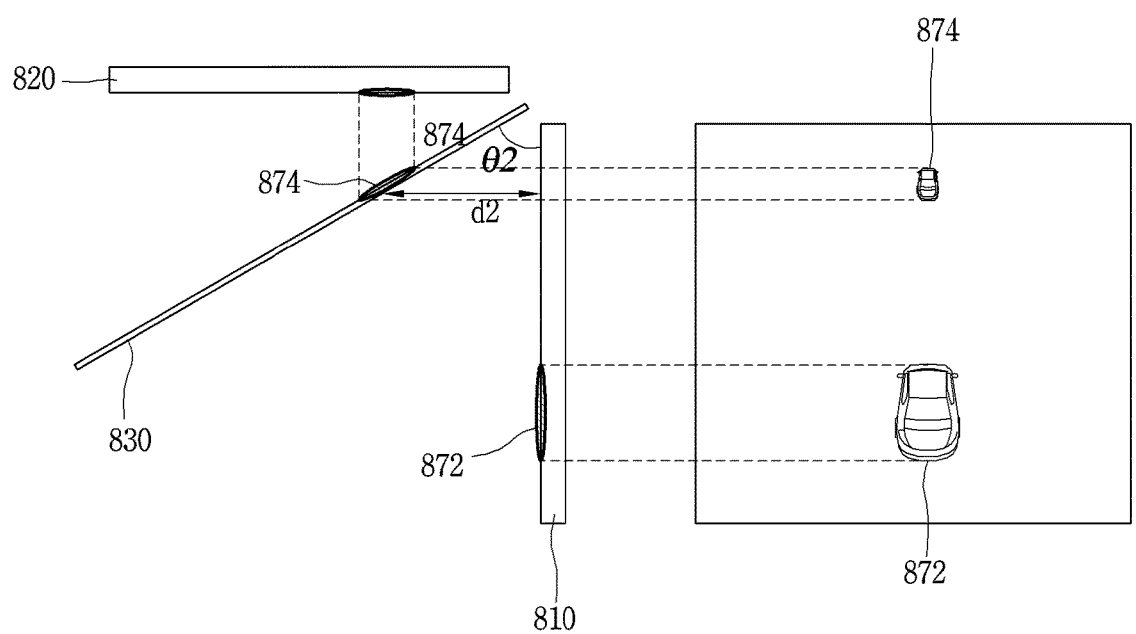

Meanwhile, FIG. 8C is an exemplary view illustrating a change in 3D depth according to tilting of the light synthesizing unit.

In the display device 800 according to the present invention, the light synthesizing unit 830 may be tilted so that the reference angle between the light synthesizing unit 830 and the first display 810 varies.

The driving unit 840 may include a rotation shaft for providing power and the light synthesizing unit 830 may be coupled to the rotation shaft to be tilted between the first and second displays 810 and 820.

More specifically, the processor 860 controls the driving unit 840 such that the reference angle is varied to a predetermined angle corresponding to a preset condition in response to the preset condition being satisfied.

Specifically, when a preset condition is satisfied based vehicle driving information received through the communication unit 850, the processor 860 may control the driving unit 840 accordingly. For example, the driving unit 840 may be controlled such that the reference angle is changed to a first angle when the first condition is satisfied, and controlled such that the reference angle is changed to a second angle when the second condition is satisfied.

As the driving unit 840 is driven, the light synthesizing unit 830 rotates and accordingly the reference angle between the light synthesizing unit 830 and the first display 810 changes according to the rotation.

Meanwhile, even when the same graphic object is output on the second display 820, at least one of an output position and an output size of the graphic object recognized by the user is varied according to the reference angle.

Here, the output position and the output size indicate the position and size displayed on the second display 820. On the other hand, information output on the second display 820 has an effect of being output on the first display 810 by being reflected by the light synthesizing unit 830. Thus, the output position and the output size may refer to a position and size on the first display 810 recognized by the user.

That is, even if the output position and the output size are the same, at least one of the output position and the output size may vary according to the reference angle.

For example, as illustrated in FIG. 8C, the first graphic object 872 may be output on the first display 810, and the second graphic object 874 may be output on the second display 820.

The first and second graphic objects 872 and 874 may overlap each other at a first angle θ1. In this case, when the output size of the second graphic object 874 is defined as a first size, the second graphic object 874 has a first depth value d1.

On the other hand, the first and second graphic objects 872 and 874 may be output at different positions at a second angle θ2. At this time, the output size of the second graphic object 874 may be a second size, and the second graphic object 874 may have a second depth value d2.

The processor 860 may adjust the reference angle so as to produce an effect of changing at least one of the output size and the output position of the information output on the second display 820. For example, when the tilting of the light synthesizing unit 830 is changed from the second angle θ2 to the first angle θ1, an effect that the second graphic object 874 gradually moves toward the first graphic object 872 is generated. Since the depth of the second graphic object 874 varies accordingly, a stereoscopic effect is generated.

The processor 860 may change the reference angle according to the vehicle driving information.

In this case, at least one of the output position and the output size of the second graphic object 874 may change according to the reference angle, in order to change only the 3D depth value of the second graphic object 874 in a state where the output position of the second graphic object 874 output on the second display 820 is fixed on the first display 810.

In order to generate various effects, at least one of the output position and the output size of the second graphic object 874 may also be changed at the same time of changing the reference angle.

Accordingly, the processor can change at least one of the output size and the output position of the information currently output on the second display 820 by varying the reference angle while maintaining the information currently output.

Also, at least one of the output size and the output position of the information currently output on the second display 820 may be changed while maintaining the reference angle.

In addition, at least one of the output size and the output position of the information currently output on the second display 820 may be changed while varying the reference angle.

By the operation of the processor 860, various types of information can be output in a 3D manner having different depth values. The display device 800 according to the present invention may provide 3D vehicle driving information to a passenger according to one of various embodiments.

Hereinafter, the control method of the processor 860 will be described in more detail based on the structure of the display device 800, with reference to the accompanying drawings.

Figure 9:
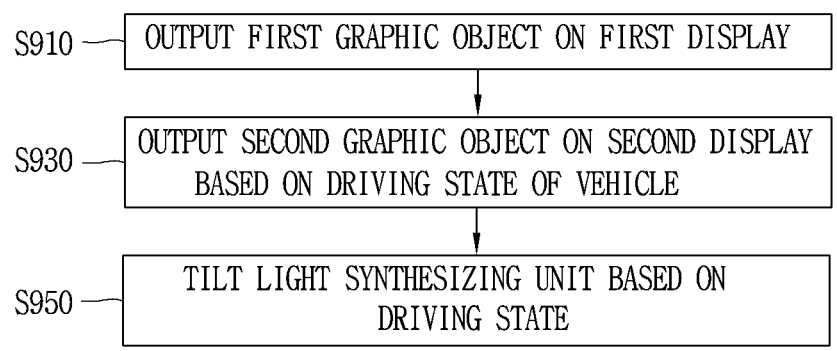
FIG. 9 is a flowchart illustrating a method of controlling a display device in accordance with the present invention.

FIG. 9 is a flowchart illustrating a method of controlling a display device according to the present invention.

First visual information may be displayed on the first display 810 according to vehicle driving information. For example, the first visual information may include a speedometer, an odometer, a tachometer, various warning lights, turn signal indicators, a fuel meter, event information for guiding an event occurring in the vehicle 100, and the like.

The second display 820 may be selectively turned on/off even when the first display 810 is turned on. For example, when a stereoscopic display mode is turned off in the vehicle 100, the second display 820 may be kept off. In another example, even when the stereoscopic display mode is turned on, the second display 820 may be kept off when there is no information to be provided to a passenger in a 3D manner.

Here, the stereoscopic display mode is defined as a state in which different types of information have different depth values and are output in a 3D manner through the light synthesizing unit 830 in a way of simultaneously outputting the different types of information on the first and second displays 810 and 820.

The light synthesizing unit 830 is formed to be tiltable, but may operate differently depending on whether the stereoscopic display mode is on or off. For example, when the stereoscopic display mode is turned on, the light synthesizing unit 830 is tilted in response to a preset condition being satisfied. However, when the stereoscopic display mode is turned off, the light synthesizing unit 830 is not tilted even when the preset condition is satisfied. The processor 860 controls the driving unit such that the light synthesizing unit 830 is not tilted even though the preset condition is satisfied when the stereoscopic display mode is turned off in the vehicle 100.

When the second display 820 is turned off, the light synthesizing unit 830 may be tilted such that the reference angle has an initial setting value.

The second display 820 may output, as second visual information, information for emphasizing at least part of the first visual information displayed on the first display 810 and/or predetermined information to be guided to a passenger in a 3D manner regardless of the first visual information.

Various visual information may be displayed on the first and second displays 810 and 820. However, for convenience of explanation, the display device 800 according to the present invention will be described based on an example in which a first graphic object is displayed on the first display 810 and a second graphic object is displayed on the second display 820. However, the present invention is not limited to the first and second graphic objects, and a plurality of graphic objects may alternatively be displayed on or disappear from at least one of the first and second displays 810 and 820 according to the control of the processor 860.

First, the processor 860 outputs the first graphic object on the first display 810 (S910).

Figure 10:
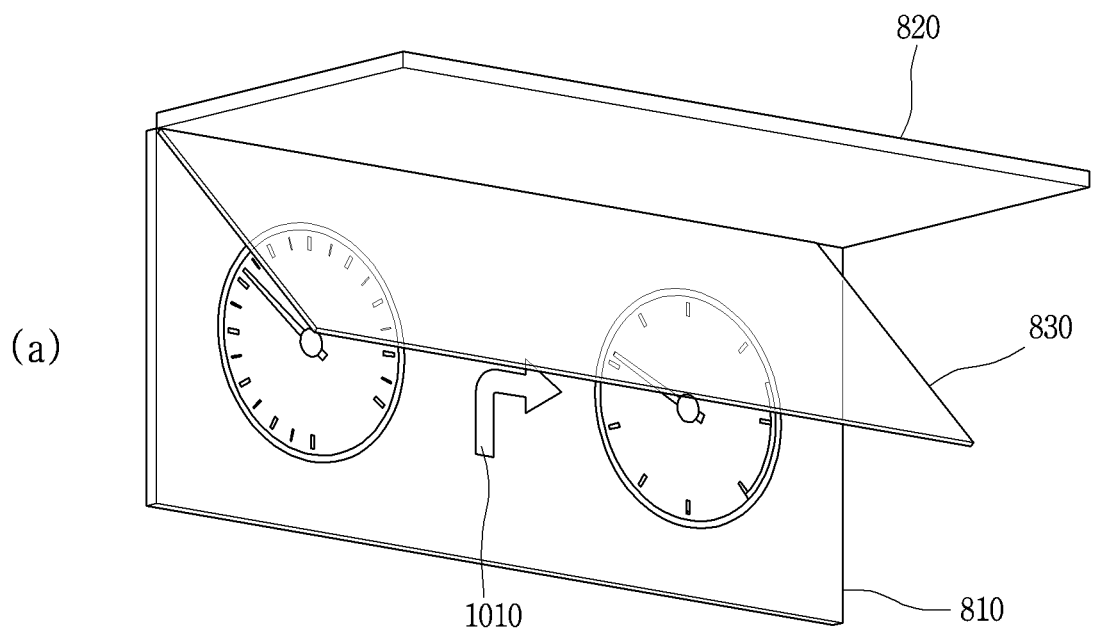
FIGS. 10 to 12 are exemplary views illustrating operations of the display device according to the control method of FIG. 9.
Figure 10:
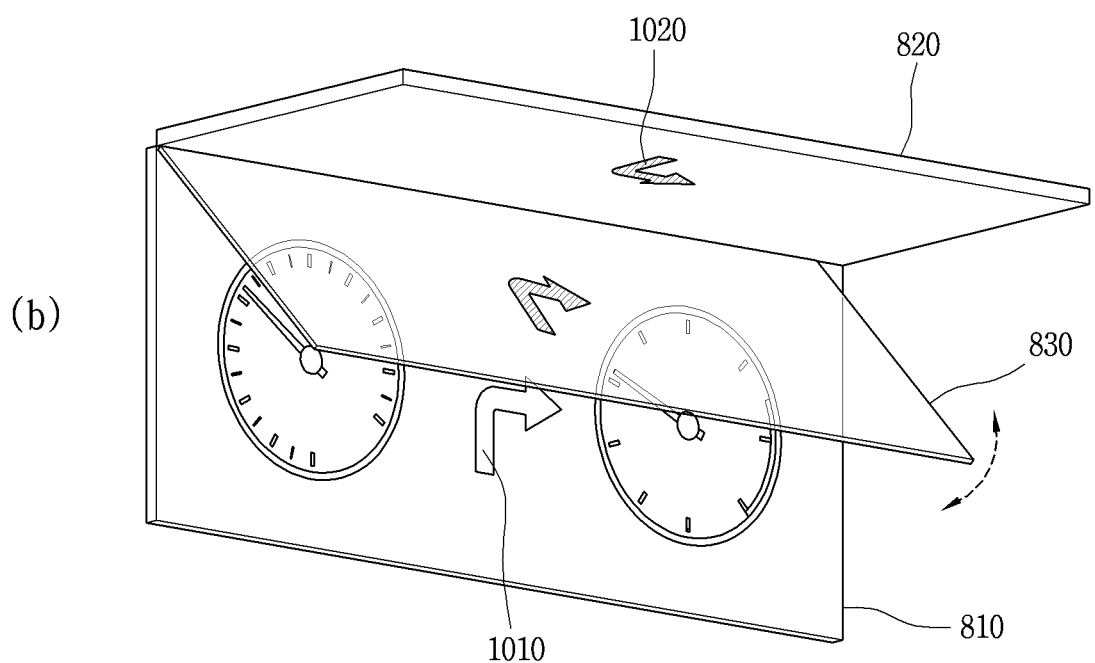

For example, as illustrated in the example (a) and the example (b) of FIG. 10, direction guidance information 1010 for guiding a route to a destination may be output on the first display 810 in a turn by turn (TBT) manner. The direction guidance information 1010 may be the first graphic object.

Figure 11:
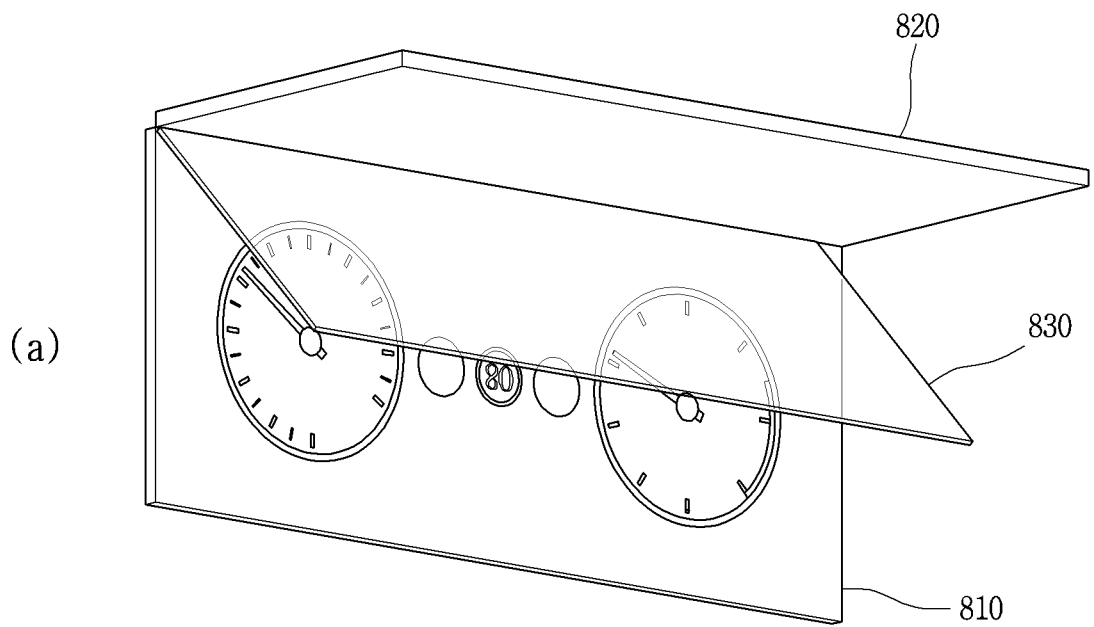
Figure 11:
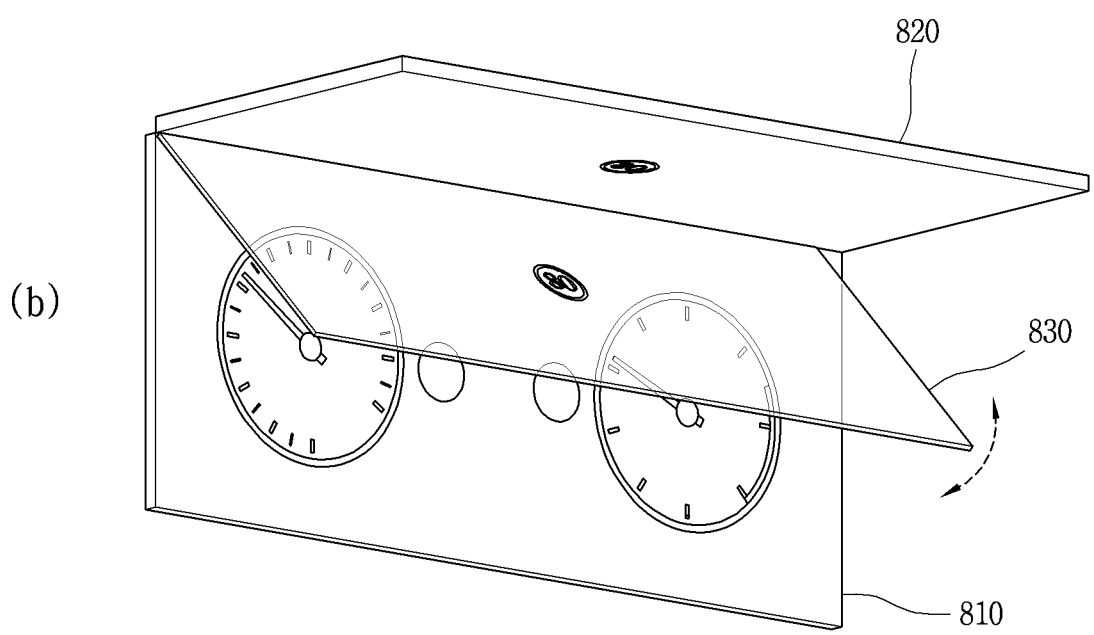
Figure 12:
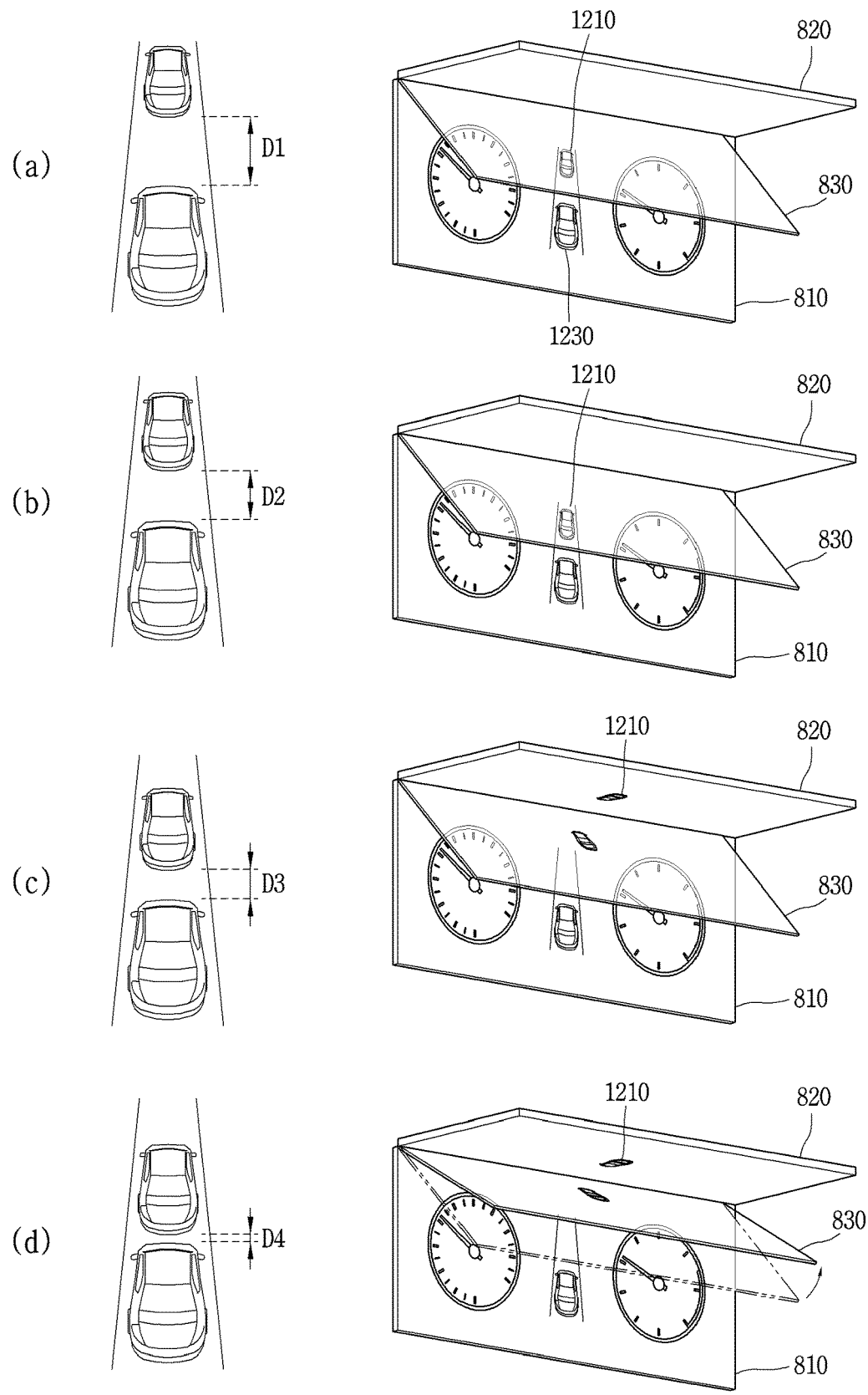

As another example, the first graphic object may be speed limit information 1110 for guiding the speed limit of a currently-traveling road as illustrated in FIG. 11, or object information 1210 for guiding an object with possibility of collision as illustrated in FIG. 12.

Next, the processor 860 displays the second graphic object on the second display 820 based on a traveling state (driving state or running state) of the vehicle 100 (S930).

The processor 860 controls the second display 820 such that the second graphic object corresponding to the first graphic object is output on the second display 820 when a preset condition is satisfied while the first graphic object is output on the first display 810.

The preset condition may be variously set, and the display device 800 may further include a memory (not illustrated) for storing such various preset conditions.

The processor 860 may determine whether at least one of the preset conditions is satisfied according to the running state of the vehicle 100, and determine a type of the second graphic object to be output and whether or not to display the second graphic object.

The processor 860 may determine the running state of the vehicle based on vehicle driving information received through the communication unit 850. That is, the second graphic object to be displayed on the second display 820 may be selected based on the vehicle driving information.

For example, as illustrated in the examples (a) and (b) of FIG. 10, when a point at which the vehicle 100 should change a direction (or a point at which the driver should pay attention) is located within a first reference distance range, the first graphic object 1010 may be output on the first display 810. Thereafter, when the point is located within a second reference distance range due to the movement of the vehicle 100, a second graphic object 1020 corresponding to the first graphic object 1010 may be output on the second display 820. Since the second graphic object 1020 is output in a manner of overlapping the first graphic object 1010, the passenger confirms a short distance left up to the point.

As another example, as illustrated in the examples (a) and (b) of FIG. 11, when the vehicle 100 enters a road on which a speed limit is set or enters a speed enforcement zone in which the speed limit is cracked down, the first graphic object 1110 may be output on the first display 810. Further, when a current speed of the vehicle 100 is faster than the speed limit, the second graphic object 1020 may be output on the second display 820 to guide or slow down the current speed.

When the second graphic object 1120 is output on the second display 820, the first graphic object 1110 output on the first display 810 may disappear from the first display 810, thereby producing an effect that the first graphic object 1110 pops out from the back to the front. Alternatively, an overlapping effect for emphasizing specific information may also be produced by simultaneously outputting the first and second graphic objects 1110 and 1120 on the first and second displays 810 and 820, respectively.

Next, the processor 860 may tilt the light synthesizing unit 830 based on the running state (or the vehicle driving information). In more detail, the processor 860 may control the driving unit 840 to vary the reference angle.

As the light synthesizing unit 830 is tilted, a distance between one point of the light synthesizing unit 830 and the first display 810 is changed and accordingly a depth value of the second graphic object output on the second display 820 is changed. In other words, the processor 860 may adjust the depth value for the second graphic object by controlling the driving unit 840. The passenger can feel the effect that the second graphic object approaches or gets away from him/her as the reference angle is changed.

For example, referring to the examples (a) and (b) of FIG. 10, before the second graphic object 1020 is output, the light synthesizing unit 830 may be tilted such that the reference angle is a minimum angle. The light synthesizing unit 830 may be tilted such that the reference angle can be changed from the minimum angle to a maximum angle as the vehicle 100 moves (or the point to switch the direction of the vehicle is getting close) after the second graphic object 1020 is output. The second graphic object 1020 has a minimum depth value at a point where the reference angle is the minimum angle, and has a maximum depth value at a point where the reference angle is the maximum angle. As a result, the passenger can intuitively perceive that the point to switch the direction of the vehicle is gradually approaching.

Afterwards, when the vehicle passes through the point, the second graphic object 1020 may disappear from the second display 820 and the light synthesizing unit 830 may be tilted such that the reference angle has the initial setting value.

As another example, referring to the examples (a) and (b) of FIG. 11, the light synthesizing unit 830 may be tilted such that the reference angle has a predetermined angle, and the predetermined angle may depend on speed of the vehicle 100. The reference angle may near the maximum angle as a current speed increases, and may near the minimum angle as the current speed slows down. Since the second graphic object 1120 has a larger depth value as the current speed is faster, the passenger can feel a sense of speed for the current speed in a stereoscopic manner.

As another example, referring to the examples (a) to (d) of FIG. 12, when there is an external object having possibility of collision with the vehicle 100, the processor 860 may output object information guiding the external object on the first display 810 as a first graphic object 1210. In detail, when the possibility of collision is a first level or a distance from the external object is within a first reference distance range, the processor 860 controls the first display 810 to output the first graphic object.

At this time, a vehicle object 1230 indicating the vehicle 100 may be output together with the first graphic object 1210. The vehicle object 1230 and the first graphic object 1210 may be displayed spaced apart from each other in proportion to distances d1 to d4 between the vehicle 100 and the external object.

The processor 860 may control the second display 820 to output a second graphic object 1220 when the possibility of collision is a second level or the distance from the external object is within a second reference distance range. And, the processor 860 may control the driving unit 840 to change the reference angle according to the distance from the external object or the possibility of collision with the external object.

When an object having possibility of collision is present, notification information informing the object may be provided by a first graphic object in a 2D manner or by a second graphic object in a 3D manner according to the possibility of collision. Furthermore, since the reference angle of the light synthesizing unit varies according to the possibility of collision, the notification information can be more effectively transmitted to the passenger.

Although not illustrated in FIG. 12, when the possibility of collision is lower than a reference value, the processor 860 may control the first and second displays 810 and 820 such that the first and second graphic objects 1210 and 1220 disappear, and control the driving unit such that the reference angle has the initial setting value.

Figure 13A:
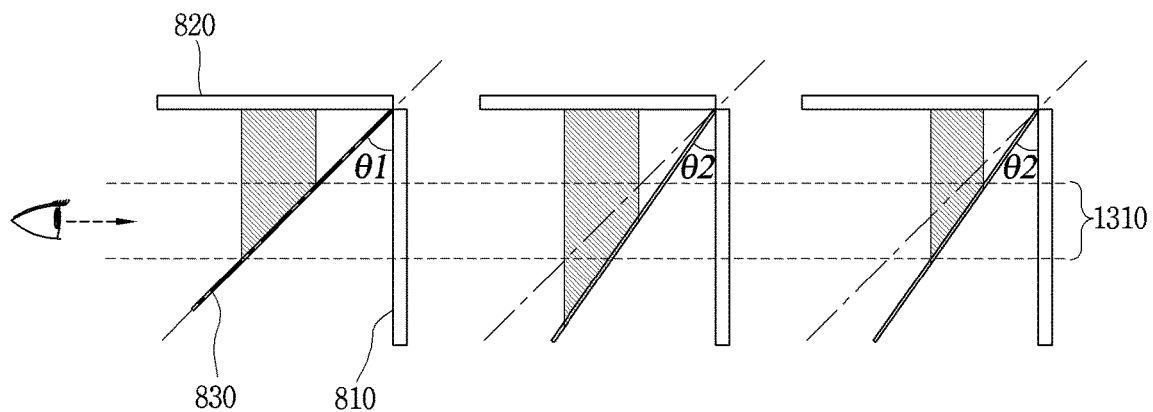
FIGS. 13A and 13B are conceptual views illustrating operations of first and second displays according to tilting of the light synthesizing unit in accordance with the present invention.
Figure 13B:
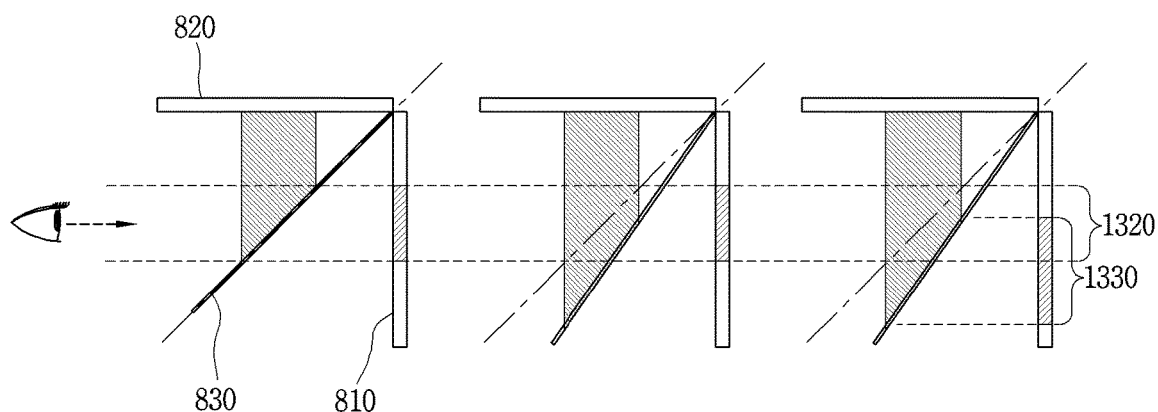

FIGS. 13A and 13B are conceptual views illustrating operations of the first and second displays according to the tilting of the light synthesizing unit.

As described above with reference to FIG. 8C, at least one of the output position and the output size of the second graphic object may vary according to the reference angle. When the second graphic object is output on the second display 820, at least one of the position and the size of the second graphic object is changed according to the reference angle.

More specifically, the processor 860 may determine the output position of the second graphic object based on the reference angle in a manner that the second graphic object overlaps the first graphic object on the light synthesizing unit 830.

When the second graphic object to be displayed on the second display 820 is determined, the processor 860 may calculate an output position where the second graphic object overlaps the first graphic object, and controls the second display 820 to output the second graphic object on the calculated output position. That is, the output position of the second graphic object may vary according to the reference angle.

As illustrated in FIG. 13A, the first and second graphic objects may have different depth values and be output in an overlapping manner at a first angle θ1.

At least one of the output position and the output size of the second graphic object is changed when the second graphic object is displayed as it is after the reference angle is changed from the first angle θ1 to a second angle θ2.

In order not to cause such change, the processor 860 may calculate an output position 1310 of the second graphic object where the first and second graphic objects overlap each other, and calculate an output position and an output size of the second graphic object for outputting the second graphic object on the output position 1310 at the second angle θ2. The processor 860 controls the second display 820 so that the second graphic object is output in the calculated output size at the calculated output position.

Accordingly, the second graphic object can have a different depth value while maintaining its output position.

Meanwhile, the processor 860 may also maintain the output position and the output size of the second graphic object without a change while tilting the light synthesizing unit 830.

As an example, an output position on which the second graphic object is to be output may be preset. In this case, the processor 860 may adjust the reference angle so that the second graphic object output on the preset position overlaps the first graphic object. In other words, the processor 860 may set a predetermined angle so that the second graphic object overlaps the first graphic object, and control the driving unit 840 such that the reference angle can be the predetermined angle.

As another example, the processor 860 may adjust at least one of the output position and the output size of the first graphic object such that the second graphic object and the first graphic object overlap each other when the light synthesizing unit 830 is tilted.

As illustrated in FIG. 13B, when the second graphic object may move from a first output position 1320 to a second output position 1330 when the reference angle is changed while the first and second graphic objects are output. At this time, the processor 860 may also produce an effect that the first and second graphic objects continuously overlap each other in a manner of moving the first graphic object from the first output position 1320 to the second output position 1330. In other words, when the second graphic object is output on the second display 820, at least one of a position and a size of a screen output on the first display 810 may be changed according to the reference angle.

Figure 14:
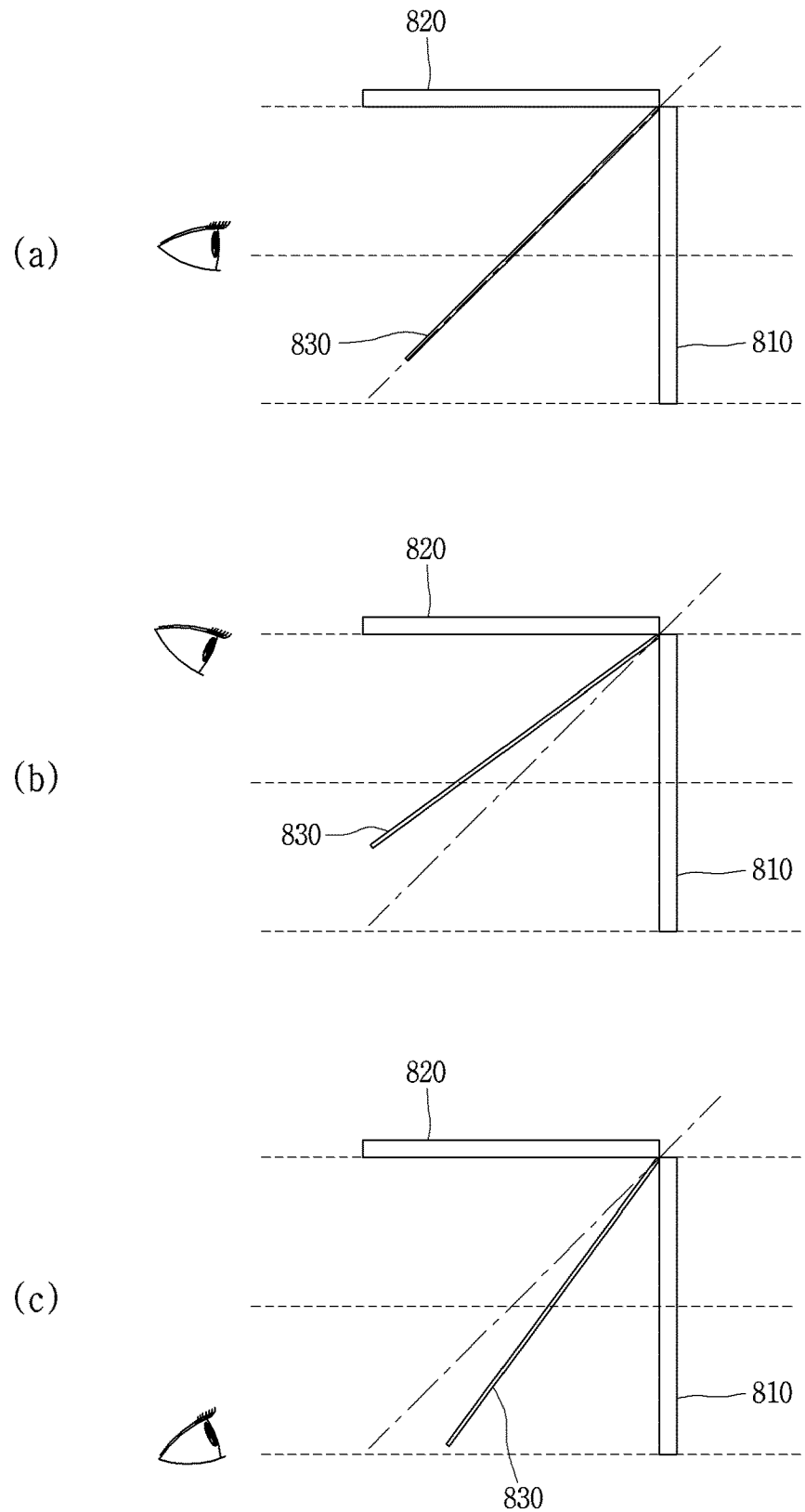
FIG. 14 is an exemplary view illustrating an operation of a display device according to positions of driver's eyes.

FIG. 14 is an exemplary view illustrating an operation of a display device according to positions of the driver's eyes.

Referring to the examples (a) to (c) of FIG. 14, height (or position) of the driver's eyes viewing the display device of the present invention is inevitably varied according to a body structure of the driver (or passenger) and a height of seats provided in the vehicle 100. The display device 800 according to the present invention may provide an optimal stereoscopic display mode based on the eye height.

First, the processor 860 obtains an eye height (or an eye position) and/or a gaze direction (or a viewing direction) of the passenger. For example, the display device 800 according to the present invention may confirm the eye height and/or the gaze direction of the passenger based on information received from various sensors provided in the vehicle 100. For example, the display device 800 further includes a camera (not shown), and is allowed to track the eye height and/or the gaze direction of the passenger using the camera.

The processor 860 may control the driving unit 840 such that the reference angle of the light synthesizing unit 830 is changed based on obtained information. In other words, the light synthesizing unit 830 may be tilted so that the reference angle is a predetermined angle, and the predetermined angle may vary according to the eye height (position) and/or the gaze direction of the passenger (or the driver).

In detail, the processor 860 may specify a gaze direction according to an eye height (eye position) of the passenger, and calculate an angle between the specified gaze direction and a direction that one surface of the light synthesizing unit 830 faces. The processor 860 may control the driving unit 840 so that the calculated angle is within a predetermined angle range. As the eye position of the passenger changes, the calculated angle may also change in real time.

Since the angle changes according to the eye position of the passenger, it may be possible to prevent in advance visual information, which is output from the second display 820 and reflected by the light synthesizing unit 830, from disappearing from the passenger's gaze (field of view).

Figure 15:
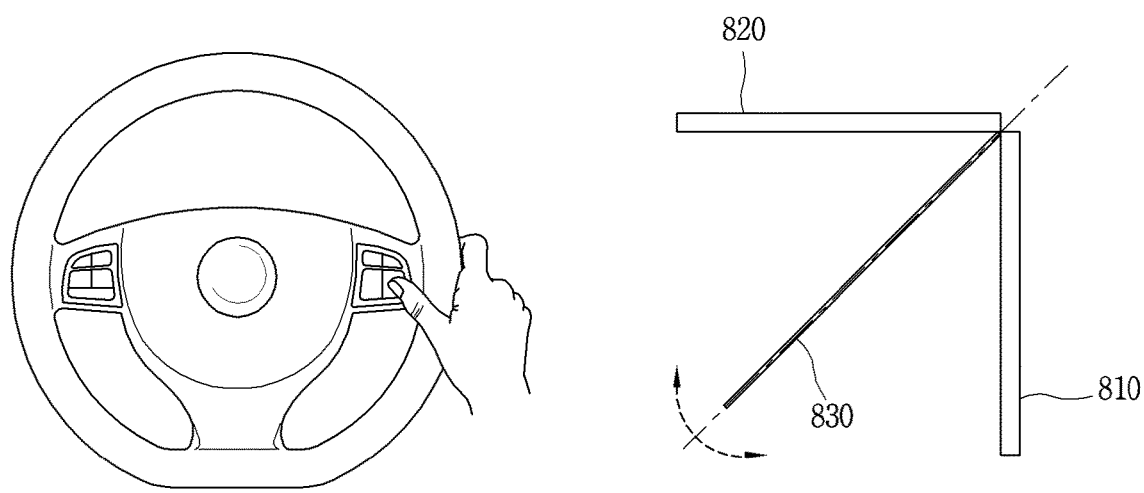
FIG. 15 is an exemplary view illustrating an operation of a display device according to a user input.

FIG. 15 is an exemplary view illustrating an operation of the display device according to a user input.

The vehicle 100 may include a user input unit for receiving various types of user inputs. For example, various buttons may be provided on the steering wheel of the vehicle 100, and predetermined user inputs are generated in response to the buttons being pressed.

The display device 800 may receive a user input applied by a passenger from at least one processor provided in the vehicle 100 through the communication unit 850, and control the driving unit 840 such that the reference angle of the light synthesizing unit 830 has a predetermined angle based on the received user input.

In other words, the light synthesizing unit 830 may be tilted such that the reference angle has a predetermined angle, and the predetermined angle may vary according to a user input.

Figure 16A:
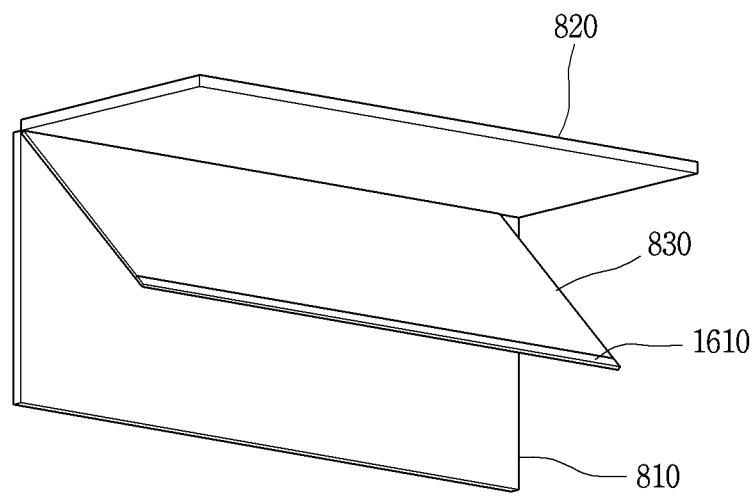
FIGS. 16A and 16B are conceptual views illustrating a light source unit that emits light of a predetermined color to a light synthesizing unit.
Figure 16B:
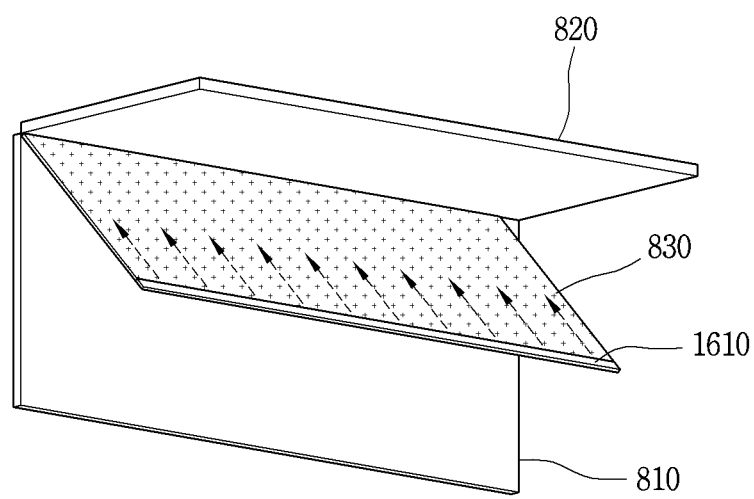

FIGS. 16A and 16B are conceptual views illustrating a light source unit that emits light of a predetermined color to the light synthesizing unit.

As illustrated in FIG. 16A, a light source unit 1610 for emitting light of a predetermined color to the light synthesizing unit 830 may be disposed on one end of the light synthesizing unit 830.

Since the light synthesizing unit 830 is made transparent, the light of the predetermined color emitted from the light source unit 1610 is reflected within the light synthesizing unit 830 and spreads over the light synthesizing unit 830.

As illustrated in FIG. 16B, when the light source unit 1610 emits the light of the predetermined color, an effect that the light synthesizing unit 830 outputs a background image having the predetermined color is generated.

The processor 860 may change depth generated by the light synthesizing unit 830 by adjusting a color of light emitted from the light source unit 1610. Also, the processor 860 may control the light source unit 1610 to emit light of a different color according to the reference angle of the light synthesizing unit 830.

Meanwhile, the light synthesizing unit 830 may be formed so that light transmittance of at least one area thereof is variable.

The light synthesizing unit 830 transmits first light output from the first display 810 therethrough and reflects second light output from the second display 820 such that the first light and the second light are directed to the same path.

When the transmittance of the light synthesizing unit 830 changes, an amount of the first light transmitted through the light synthesizing unit 830 may be varied, but an amount of the second light reflected by the light synthesizing unit 830 may be kept constant. In this case, although sharpness of the second graphic object formed by the second light is maintained as it is, sharpness of the first graphic object formed by the first light is varied.

The processor 860 may blur the first graphic object by adjusting the transmittance of the light synthesizing unit 830. In other words, since the first graphic object is changed to an out-of-focus state according to the transmittance of the light synthesizing unit 830 but the second graphic object is displayed as it is, a depth of field may be lowered. An effect of viewing the display device using a telephoto lens is generated, so that a concentration of the passenger on the second graphic object can be induced.

The display device 800 according to the present invention may further include a structural feature for more effectively generating the blurring effect.

Figure 17:
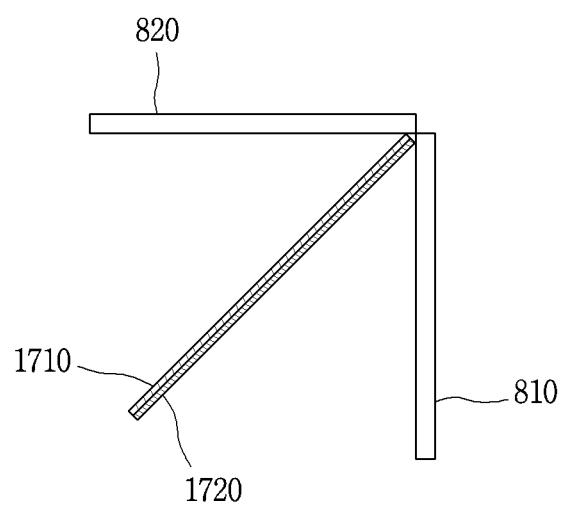
FIG. 17 is a conceptual view illustrating a structural characteristic of a light synthesizing unit in accordance with one embodiment of the present invention.

FIG. 17 is a conceptual view illustrating a structural feature of a light synthesizing unit according to one embodiment of the present invention.

As illustrated in FIG. 17, the light synthesizing unit 830 may include a first light synthesizing portion 1710 having first light transmittance, a second light synthesizing portion 1720 overlapping the first light synthesizing portion and having second light transmittance.

The second light output from the second display 820 is reflected by the first light synthesizing portion 1710 to be directed to the same path as the first light output from the first display 810.

Since the second light output from the first display 810 must pass through both the first and second light synthesizing portions 1710 and 1720, a less amount of light than the second light is transferred to the passenger.

According to this structural feature, second visual information formed by the second light is more vivid than first visual information formed by the first light. In other words, a blurring effect may occur only in the first visual information.

Meanwhile, the processor 860 may control at least one of the first light transmittance and the second light transmittance so as to be changed according to the reference angle of the light synthesizing unit 830. For example, the processor 860 may control the at least one light transmittance such that the blurring effect can be maximized when the reference angle is within a first angular range, and such that the blurring effect can be minimized when the reference angle is within a second angular range.

Meanwhile, the display device 800 according to the present invention may provide an environment in which a user can directly change a 3D interface provided through the display device 800.

Figure 18A:
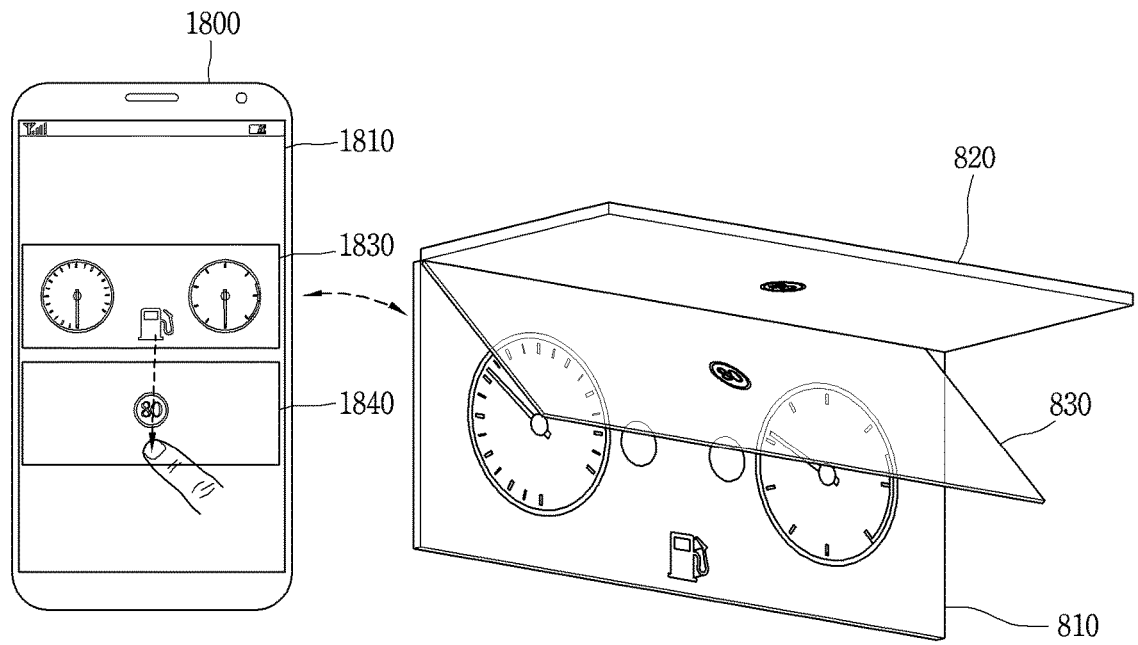
FIGS. 18A and 18B are exemplary views illustrating a display device operable with a mobile terminal.
Figure 18B:
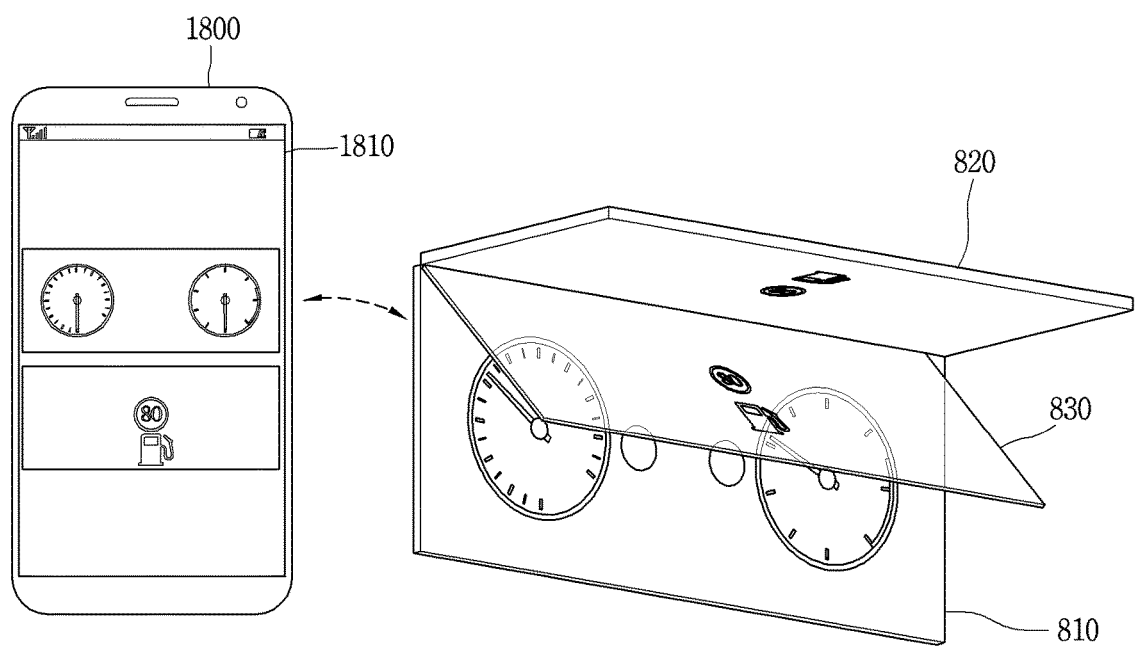

FIGS. 18A and 18B are conceptual views illustrating a display device operable with a mobile terminal.

An environment in which a 3D interface can be changed may be implemented through a mobile terminal 1800 having a display 1810. More specifically, the mobile terminal 1800 and the display device 800 may be controlled by an application installed in the mobile terminal 1800.

The application may control the display 1810 of the mobile terminal 1800 to output thereon a first image 1830 corresponding to the first display 810 and a second image 1840 corresponding to the second display 820.

Icons included in a first group may be displayed on the first image 1830 as information which is expected to be output on the first display 810. For example, when a speedometer, a tachometer, and a warning light are displayed on the first display 810, corresponding icons may be included in the first group and displayed on the first image 1830.

Icons included in a second group may be displayed on the second image 1840 as information which is expected to be output on the second display 820. For example, when speed limit information is displayed on the second display 820, a corresponding icon may be included in the second group and displayed on the second image 1840.

The application may change a position where at least one icon is to be displayed according to a touch input applied to the display 1810 of the mobile terminal 1800. For example, as illustrated in FIG. 18A, the application may move one icon displayed on the first image 1830 to be displayed on the second image 1840.

As illustrated in FIG. 18B, the application may control the display device 800, based on the position to which the one icon has been moved, so that information corresponding to the one icon is moved on the first and second displays 810 and 820. In detail, the application may transmit a control command to the display device 800 through a communication unit of the mobile terminal 1800 to cause the information corresponding to the one icon to move from a first position to a second position, and the display device 800 may then move the output position of the information corresponding to the one icon according to the control command.

Although not illustrated, the application may provide a user interface by which new information can be additionally displayed on the display device, previously-output information can disappear, or at least one of an output position and an output size can be edited. In addition, the application may provide an interface to change the reference angle.

Accordingly, the passenger can directly change and select a type of information to be provided in a three-dimensional manner and an output position of the information by using his/her mobile terminal.

The operation of the display device 800 of the present invention described above with reference to FIGS. 8A to 18 may extend up to the vehicle 100 provided with the display device 800.

The present invention can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display device for a vehicle, the display device comprising:
   a first display configured to output first light to form first visual information on the first display;
   a second display configured to output second light to form second visual information on the second display; and
   a light synthesizing unit that is located between the first display and the second display, that is configured to tilt in a manner that varies a reference angle between the light synthesizing unit and the first display, and that is configured to cause the first light from the first display and the second light from the second display to have a same path by transmitting light from one of the first and second displays and reflecting light from the other of the first and second displays,
   wherein the second display is configured to, based on the reference angle, form the second visual information having a different three-dimensional depth with respect to the first visual information.

2. The device of claim 1, further comprising:
   a driving unit coupled to the light synthesizing unit,
   wherein the driving unit is configured to provide, to the light synthesizing unit, power to tilt the light synthesizing unit between the first display and the second display.

3. The device of claim 1, further comprising a processor configured to:
   determine whether a preset condition is satisfied, and
   based on a determination that the preset condition is satisfied, control the light synthesizing unit to tilt to a predetermined angle corresponding to the preset condition.

4. The device of claim 3, wherein the processor is configured to:
   in a state in which the first display outputs a first graphic object and the preset condition is satisfied, control the second display to output a second graphic object corresponding to the first graphic object.

5. The device of claim 4, wherein the processor is configured to:
   based on the reference angle, determine an output position of the second graphic object on the second display such that a first image on the light synthesizing unit that corresponds to the first graphic object overlaps with a second image on the light synthesizing unit that corresponds to the second graphic object.

6. The device of claim 4, wherein the processor is configured to:
   determine a value of the reference angle such that a first image on the light synthesizing unit that corresponds to the first graphic object matches to a second image on the light synthesizing unit that corresponds to the second graphic object.

7. The device of claim 4, wherein the processor is configured to:
   determine whether the second display outputs the second graphic object, and
   based on a determination that the second display outputs the second graphic object, remove the first graphic object from the first display.

8. The device of claim 4, wherein the processor is configured to:
   determine a possibility of collision between an external object and the vehicle,
   determine whether the possibility of collision satisfies a first level or a second level,
   based on a determination that the possibility of collision satisfies the first level, control the first display to output the first graphic object, and
   based on a determination that the possibility of collision satisfies the second level, control the second display to output the second graphic object.

9. The device of claim 8, wherein the light synthesizing unit is configured to:
   vary the reference angle based on the possibility of collision.

10. The device of claim 8, wherein the processor is configured to:
    determine that the possibility of collision is lower than a reference level,
    based on the determination that the possibility of collision is lower than the reference level, remove the first graphic object and the second graphic object from the first display and the second display, respectively, and reset the reference angle to an initial value.

11. The device of claim 4, wherein the light synthesizing unit is configured to:
    vary at least one of an output position of the second graphic object and an output size of the second graphic object on the second display based on the predetermined angle.

12. The device of claim 4, wherein:
    in a state in which the second display outputs the second graphic object, the light synthesizing unit is configured to vary at least one of an output position of a screen output and an output size of a screen output on the first display based on the predetermined angle.

13. The device of claim 3, wherein the processor is configured to:
    determine whether the vehicle operates in a stereoscopic mode, and
    based on a determination that the vehicle does not operate in the stereoscopic mode, prevent the light synthesizing unit from being tilted regardless of the preset condition being satisfied.

14. The device of claim 1, further comprising:
    a light source unit that is coupled to the light synthesizing unit and that is configured to emit light having a first color to the light synthesizing unit.

15. The device of claim 3, wherein the processor is configured to:
    obtain information about speed of the vehicle, and
    based on the information about speed of the vehicle, tilt the light synthesizing unit.

16. The device of claim 3, wherein the processor is configured to:
    obtain information about user input, and
    based on the information about user input, tilt the light synthesizing unit.

17. The device of claim 3, wherein the processor is configured to:
    obtain information about eye positions of a driver of the vehicle, and
    based on the information about eye positions of the driver of the vehicle, tilt the light synthesizing unit.

18. The device of claim 1, wherein the light synthesizing unit includes a portion of which light transmittance is variable, and
  wherein a value of the light transmittance of the portion is changed based on a value of the reference angle.

19. The device of claim 18, wherein the light synthesizing unit comprises:
  a first portion that has first light transmittance, and
  a second portion that has second light transmittance and that covers, fully or in part, the first portion, and
  wherein at least one of a value of the first light transmittance and a value of the second light transmittance is changed based on a value of the reference angle.

20. The device of claim 3, wherein the processor is configured to:
  determine whether the second display is turned off, and
  based on a determination that the second display is turned off, tilt the light synthesizing unit at a default value of the reference angle.

* * * * *